United States Patent
Ito et al.

(10) Patent No.: US 7,454,070 B2
(45) Date of Patent: Nov. 18, 2008

(54) IMAGE ENCODING APPARATUS AND METHOD, COMPUTER PROGRAM, AND COMPUTER-READABLE STORAGE MEDIUM

(75) Inventors: Naoki Ito, Tokyo (JP); Hirokazu Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 691 days.

(21) Appl. No.: 11/220,541

(22) Filed: Sep. 8, 2005

(65) Prior Publication Data
US 2006/0050975 A1 Mar. 9, 2006

(30) Foreign Application Priority Data
Sep. 8, 2004 (JP) .............................. 2004-261570

(51) Int. Cl.
*G06K 9/36* (2006.01)
(52) U.S. Cl. .................................................. 382/232
(58) Field of Classification Search ......... 382/232–233, 382/235, 238–240, 244–250; 358/426.01, 358/426.05–426.07, 426.13–426.14; 348/384.1, 348/390.1, 394.1–395.1, 420.1–421.1, 430.1; 375/240, 240.01–240.02, 240.12, 240.18–240.19, 375/240.23–240.24
See application file for complete search history.

(56) References Cited

U.S. PATENT DOCUMENTS

| | | | | |
|---|---|---|---|---|
| 5,402,248 A | 3/1995 | Sato et al. | ................... | 358/426 |
| 5,701,367 A | 12/1997 | Koshi et al. | .................. | 382/239 |
| 5,889,596 A | 3/1999 | Yaguchi et al. | ............. | 358/448 |
| 5,945,930 A | 8/1999 | Kajiwara | ..................... | 341/50 |
| 5,960,116 A | 9/1999 | Kajiwara | .................... | 382/238 |
| 6,031,938 A | 2/2000 | Kajiwara | .................... | 382/239 |
| 6,067,382 A | 5/2000 | Maeda | ....................... | 382/239 |
| 6,094,510 A | 7/2000 | Yaguchi et al. | ............. | 382/232 |
| 6,097,364 A | 8/2000 | Miyamoto et al. | ............ | 345/97 |
| 6,101,282 A | 8/2000 | Hirabayashi et al. | ........ | 382/246 |
| 6,233,355 B1 | 5/2001 | Kajiwara | .................... | 382/238 |
| 6,266,449 B1 | 7/2001 | Ohsawa | ..................... | 382/239 |
| 6,310,980 B1 | 10/2001 | Kajiwara | .................... | 382/238 |
| 6,501,859 B1 | 12/2002 | Kajiwara | .................... | 382/239 |
| 6,549,676 B1 | 4/2003 | Nakayama et al. | ........ | 382/246 |
| 6,560,365 B1 | 5/2003 | Nakayama et al. | .......... | 382/233 |
| 6,665,444 B1 | 12/2003 | Kajiwara | .................... | 382/240 |
| 6,711,295 B2 | 3/2004 | Kakayama et al. | .......... | 382/232 |
| 6,768,819 B2 | 7/2004 | Yamazaki et al. | ........... | 382/240 |

(Continued)

FOREIGN PATENT DOCUMENTS

JP 07-123273 5/1995

(Continued)

*Primary Examiner*—Jose L Couso
(74) *Attorney, Agent, or Firm*—Fitzpatrick, Cella, Harper & Scinto

(57) ABSTRACT

According to this invention, encoded data of a target data amount is generated by one image input operation while both lossless encoding and lossy encoding are adopted. For this purpose, an encoding sequence control unit controls a first encoding unit for lossy (JPEG) encoding, a second encoding unit for lossless (JPEG-LS) encoding, first and second memories, and a re-encoding unit, and stores, in a first memory, encoded data of a target data amount or less that contains both losslessly and lossily encoded data. A correction unit corrects, of encoded data stored in the first memory, encoded data of an isolated type to the type of neighboring encoded data, and outputs the corrected data.

15 Claims, 28 Drawing Sheets

U.S. PATENT DOCUMENTS

| | | | |
|---|---|---|---|
| 6,847,735 B2 | 1/2005 | Kajiwara et al. | 382/233 |
| 6,879,726 B2 | 4/2005 | Sato et al. | 382/239 |
| 6,917,716 B2 | 7/2005 | Kajiwara et al. | 382/240 |
| 6,947,600 B1 | 9/2005 | Sato et al. | 382/233 |
| 6,985,630 B2 | 1/2006 | Kajiwara | 382/233 |
| 7,013,050 B2 | 3/2006 | Kajiwara | 382/240 |
| 7,031,536 B2 | 4/2006 | Kajiwara | 382/240 |
| 7,106,911 B2 | 9/2006 | Ohta et al. | 382/251 |
| 7,136,531 B2 | 11/2006 | Satoh | 376/240.03 |
| 7,194,140 B2 | 3/2007 | Ito et al. | 382/251 |
| 7,215,818 B2 | 5/2007 | Naito | 382/239 |
| 7,227,998 B2 * | 6/2007 | Nakayama et al. | 382/232 |
| 7,257,264 B2 | 8/2007 | Nakayama et al. | 375/240.04 |
| 7,302,105 B2 | 11/2007 | Kajiwara | 382/240 |
| 2003/0031371 A1 | 2/2003 | Kato et al. | 382/239 |
| 2003/0043905 A1 | 3/2003 | Nakayama et al. | 375/240.04 |
| 2003/0086127 A1 | 5/2003 | Ito et al. | 358/462 |
| 2003/0086597 A1 | 5/2003 | Ohta et al. | 382/131 |
| 2003/0118240 A1 | 6/2003 | Satoh et al. | 382/239 |
| 2003/0164975 A1 | 9/2003 | Aoyagi et al. | 358/1.15 |
| 2003/0169934 A1 | 9/2003 | Naito | 382/239 |
| 2003/0194138 A1 | 10/2003 | Osawa et al. | 382/233 |
| 2003/0202582 A1 | 10/2003 | Satoh | 375/240.03 |
| 2003/0228063 A1 | 12/2003 | Nakayama et al. | 382/251 |
| 2004/0213347 A1 | 10/2004 | Kajiwara et al. | 375/240.11 |
| 2005/0100226 A1 | 5/2005 | Kajiwara et al. | 382/173 |
| 2005/0249283 A1 | 11/2005 | Kajiwara et al. | 375/240.12 |
| 2006/0023957 A1 | 2/2006 | Ito | 382/232 |
| 2006/0045362 A1 | 3/2006 | Ito et al. | 382/232 |

FOREIGN PATENT DOCUMENTS

| | | |
|---|---|---|
| JP | 10-224640 | 8/1998 |
| JP | 2003-008903 | 1/2003 |
| JP | 2003-209698 | 7/2003 |

* cited by examiner

IMAGE ENCODING APPARATUS AND METHOD, COMPUTER PROGRAM, AND COMPUTER-READABLE STORAGE MEDIUM

FIELD OF THE INVENTION

The present invention relates to a technique of encoding image data.

BACKGROUND OF THE INVENTION

Conventionally, still image data is often compressed by either a method using discrete cosine transformation or a method using Wavelet transformation. Encoding of this type is variable-length encoding, and hence the code amount changes for each image to be encoded.

According to JPEG encoding as an international standardization scheme, only one quantization matrix can be defined for an image, and it is difficult to make encoded data of one image (document) fall within a target code amount without a prescan. When JPEG encoding is used in a system which stores data in a limited memory, an overflow of memory may occur.

In order to prevent this, conventional schemes use, for example, a method of re-reading the same document upon changing the compression ratio parameter when the actual code amount exceeds an expected code amount, or a method of estimating a code amount in advance by prescan and re-setting quantization parameters to adjust the code amount.

As described above, prescan and actual scan are generally executed, but a document must be read at least two times, at poor efficiency.

Especially when a copying machine encodes a document of a plurality of sheets (pages) while successively reading it page by page by an ADF (Auto Document Feeder), it is impossible in terms of the process time to read the same document twice.

The assignee of the present invention has proposed a technique of eliminating these two, prescan and actual scan operations, and encoding one entire image using a common encoding parameter to compress the encoded data into a target encoded data amount (Japanese Patent Laid-Open No. 2003-8903). According to this technique, encoded data are sequentially stored in two memories during one image input operation (for one page). When the amount of encoded data in a predetermined memory exceeds a predetermined size during this operation, the data in the predetermined memory is discarded, the current encoding parameter is updated to a new encoding parameter for increasing the compression ratio, and encoding of image data of an unencoded part continues (encoded data obtained at this time is defined as the first encoded data). At this time, encoded data obtained by encoding before the compression ratio is increased are stored in the other memory, and the encoded data are re-encoded in accordance with the updated parameter. As a result, encoded data identical to those obtained by encoding data at the new parameter from the beginning can be attained (encoded data obtained by re-encoding is defined as the second encoded data). The first and second encoded data are concatenated to obtain data (complying with JPEG encoding) which is encoded at a common encoding parameter (updated encoding parameter) for one entire image (of one page). In addition, the encoded data amount can be suppressed to a target encoded data amount.

Unlike the technique of executing re-encoding in accordance with the encoded data amount in the process of encoding, as described in the above reference (Japanese Patent Laid-Open No. 2003-8903), a technique of keeping an entire image at a predetermined code amount while selectively applying either of lossless encoding and lossy encoding to a plurality of areas in an image is also available (Japanese Patent Laid-Open No. 10-224640).

Compression encoding in the conventional technique disclosed in Japanese Patent Laid-Open No. 2003-8903 adopts only a lossy compression technique such as JPEG.

According to the code amount control technique disclosed in Japanese Patent Laid-Open No. 2003-8903, when an encoded data amount generated during encoding of a 1-page image exceeds a predetermined size, a process equivalent to uniquely increasing the compression ratio for the entire page is executed, and the image quality may partially degrade more than expected. This problem becomes more serious in compressing an image containing a character/line image.

There is known a lossless encoding technique "JPEG-LS". "JPEG" is prefixed to this technique, but its encoding algorithm is completely different from general lossy JPEG. JPEG-LS is known to be lower in compression ratio for natural pictures than JPEG, but be able to losslessly encode character/line images and computer graphics at a higher compression ratio.

Considering this, when a document image containing both photographic and character/line images in one page is to be compressed, it is preferable to use lossless compression with a character/line image part.

Hence, demands for a technique using both lossy compression and lossless compression arise in order to make an encoded data amount fall within a target data amount by one image data input operation, i.e., without inputting image data again, similar to Japanese Patent Laid-Open No. 2003-8903, when a document is to be compressed. In an application of lossy encoding to part or all of an image, a common encoding parameter needs to be used for the image.

A case wherein lossless encoding or lossy encoding is performed for each predetermined pixel block of one page will be examined.

Either a lossy encoding process or lossless encoding process is executed for a predetermined pixel block size in an original image.

Assume that a given area of a document image has a character/line image and another area has a natural picture (or photographic image), and lossless encoding is performed for the character/line image area and lossy encoding is performed for the natural picture area. If these encoding processes are switched for each relatively large area, the boundary between the areas is less conspicuous as far as the user understands that a small difference in image quality is generated by a difference in encoding because encoding processes suitable for respective areas are performed.

When, however, encoding is switched by automatically determining the type of area of each small block on the basis of a predetermined criterion, lossily encoded data or losslessly encoded data may be isolatedly generated. In this situation, the image quality changes for each small block (small area), and the difference in image quality may be recognized as visual noise.

SUMMARY OF THE INVENTION

The present invention has been made to overcome the conventional drawbacks, and has as its object to generate encoded data of a target data amount by one image data input operation while using both lossy and lossless encoding techniques, use a common encoding parameter for an image by applying lossy encoding to part or all of the image, and suppress generation of block noise.

In order to solve the conventional problems, an image encoding apparatus according to the present invention has, for example, the following arrangement.

That is, there is provided an image encoding apparatus which receives image data and encodes the image data, comprising first encoding means for lossily encoding input image data for each predetermined pixel block in accordance with a first parameter to generate lossily encoded data, second encoding means for losslessly encoding input image data for the predetermined pixel block to generate losslessly encoded data, first storage means for storing, of the encoded data generated by the first encoding means and the second encoding means, encoded data of a shorter encode length in a predetermined first memory, second storage means for storing the losslessly encoded data generated by the second encoding means in a predetermined second memory, re-encoding means for decoding the losslessly encoded data in the second memory, re-encoding the decoded data in accordance with a second parameter to generate lossily encoded data, and storing, of the lossily encoded data obtained after re-encoding and the losslessly encoded data before re-encoding, encoded data of a shorter encode length in the first memory, monitoring means for monitoring an encoded data amount in the first memory and determining whether the encoded data amount has exceeded a predetermined data amount, parameter update means for, when the monitoring means determines that the encoded data amount has exceeded the predetermined data amount, (a) discarding the encoded data in the first memory, (b) updating the first parameter set for the first encoding means to a parameter having a high compression ratio, and causing the first encoding means to continue encoding of the image data, and (c) setting, as the second parameter, the same parameter as the updated first parameter for the re-encoding means, and causing the re-encoding means to re-encode losslessly encoded data obtained before the encoded data amount exceeds the predetermined data amount, and correction means for, when an encoding process for one page is completed, correcting, of encoded data of pixel blocks that are stored in the first memory, isolated encoded data of a type different from a type of neighboring encoded data to the type of the neighboring encoded data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail below with reference to the accompanying drawings.

Description of the Outline of Apparatus

Figure 22:
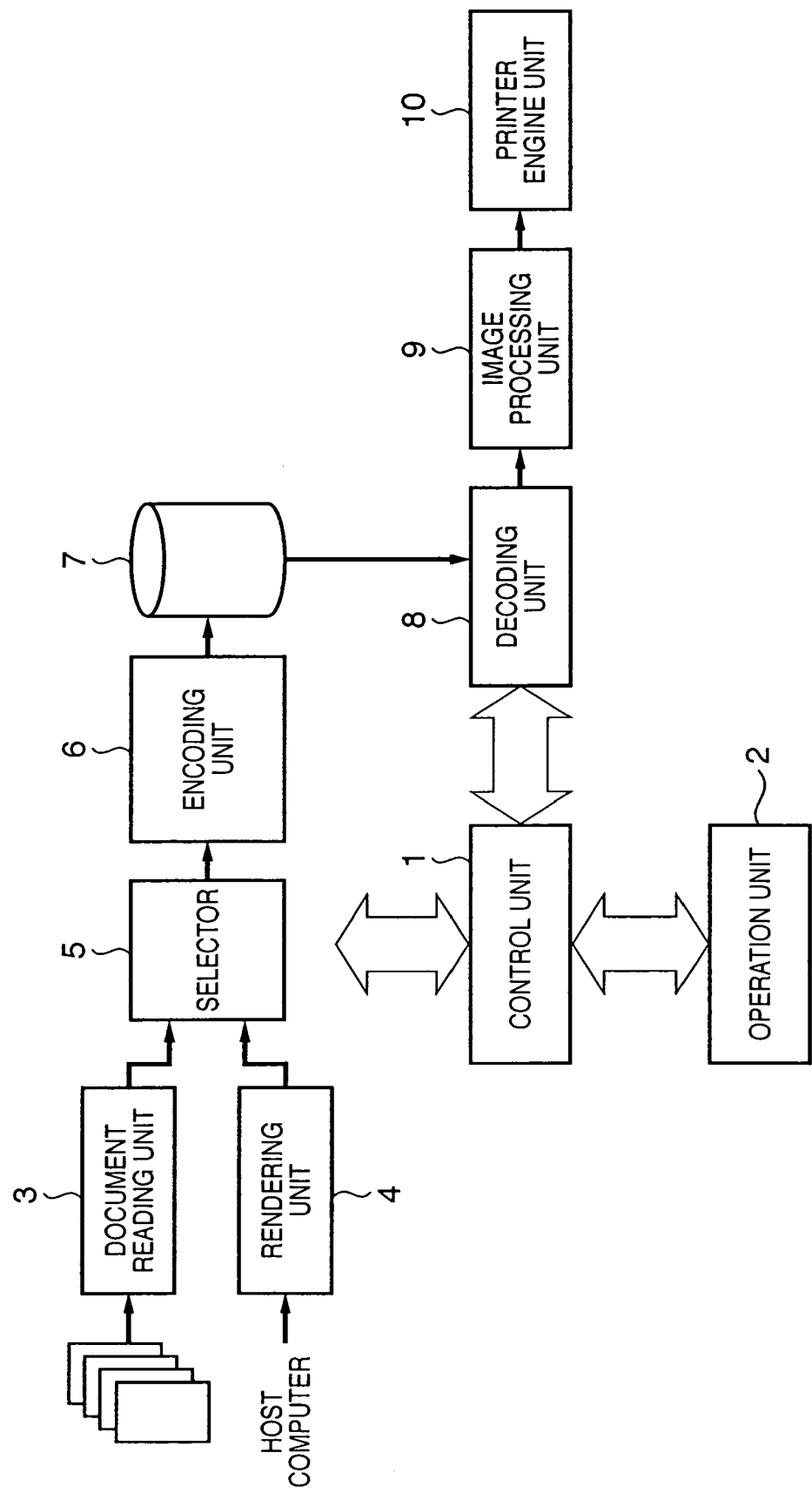
FIG. 22 is a block diagram showing a copying machine to which the embodiment is applied.

FIG. 22 is a block diagram showing a copying machine to which an embodiment is applied.

In FIG. 22, reference numeral 1 denotes a control unit which controls the overall apparatus, and is made up of a CPU, ROM, RAM, and the like. Reference numeral 2 denotes an operation unit which is made up of an LCD display, various switches, buttons, and the like. Reference numeral 3 denotes a document reading unit (image scanner unit) which includes an ADF (Auto Document Feeder). The document reading unit 3 outputs a read image as digital data of 8 bits (256 gray levels) for each of R, G, and B color components. Reference numeral 4 denotes a rendering unit which renders a print image on the basis of PDL print data received via an interface (including a network interface: not shown). Reference numeral 5 denotes a selector which selects and outputs one of bitmap images output from the document reading unit 3 and rendering unit 4 in accordance with an instruction from the control unit 1.

Reference numeral 6 denotes an encoding unit which is a feature of the embodiment. Although details of the encoding unit 6 will be described later, the encoding unit 6 encodes image data.

Reference numeral 7 denotes a secondary storage device (in the embodiment, a hard disk drive) which sequentially stores encoded data output from the encoding unit 6.

Reference numeral 8 denotes a decoding unit which reads out and decodes, in the storage order, compression-encoded image data that are stored in the secondary storage device 7. Reference numeral 9 denotes an image processing unit which receives a decoded image from the decoding unit 8, and performs conversion from an RGB color space into a YMC print color space, a UCR (Under Color Removal) process, and in addition an image data correction process.

Reference numeral 10 denotes a printer engine unit whose printing mechanism is a laser beam printer engine, but can be of an arbitrary type for, e.g., discharging liquid ink.

In the above arrangement, for example, the user operates the operation unit 2 to select a copy mode, sets a document on (the ADF of) the document reading unit 3, and presses a copy start key. Then, document image data read by the document reading unit 3 are transferred in the raster order to the encoding unit 6 via the selector 5, compression-encoded by the encoding unit 6, and stored in the secondary storage device 7.

When print data is externally received, the selector 5 selects the rendering unit 4, an image based on print data generated by the rendering unit 4 is compression-encoded, and the encoded data is stored in the secondary storage device 7.

The decoding unit 8 reads out compression-encoded data from the secondary storage device 7, and decodes the readout data in accordance with the print speed of the printer engine 10. The image processing unit 9 generates print image data of Y, M, C, and K (Black) components from the decoded image data. The image processing unit 9 outputs the process result to the printer engine unit 10 to print.

As described above, a compression-encoded data storage process to the secondary storage device 7 and a read process for decoding and printing are asynchronous. That is, the secondary storage device 7 functions as a buffer interposed between an image compression process and a decoding process. Since a document reading/encoding process is independent of a decoding/printing process, many documents can be read at a high speed, and the process can quickly shift to document reading of the next job.

Figure 23:
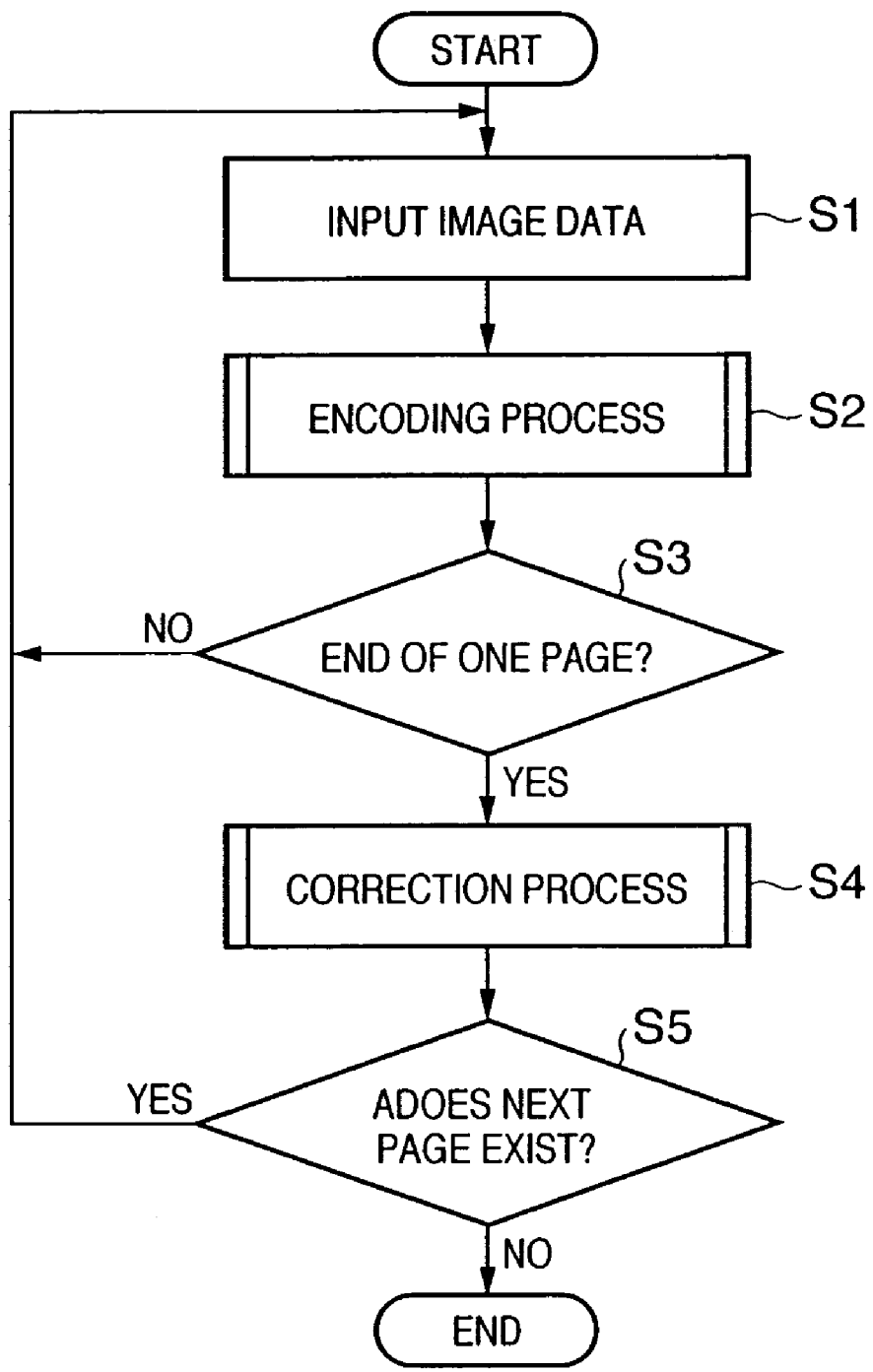
FIG. 23 is a flowchart showing the process sequence of the encoding unit according to the embodiment.

FIG. 23 is a flowchart for explaining a process by the encoding unit 6.

The encoding unit 6 reads image data of several lines in step S1, and performs an encoding process in step S2. In step S3, the encoding unit 6 continues input of the image and the encoding process until it is determined that the encoding process for one page is completed. Upon the completion of the encoding process for one page, the flow advances to step S4, and the encoding unit 6 performs a correction process of correcting the generated encoded data, and outputs the corrected data to the secondary storage device 7. If it is determined in step S5 that the next page exists, the process from step S1 is executed.

A feature of the embodiment lies in steps S2 and S4. The arrangement of the encoding unit 6 according to the embodiment and the process of step S2 based on the arrangement will be explained first, and then the process of step S4 will be explained.

Description of Encoding Unit 6

Figure 1:
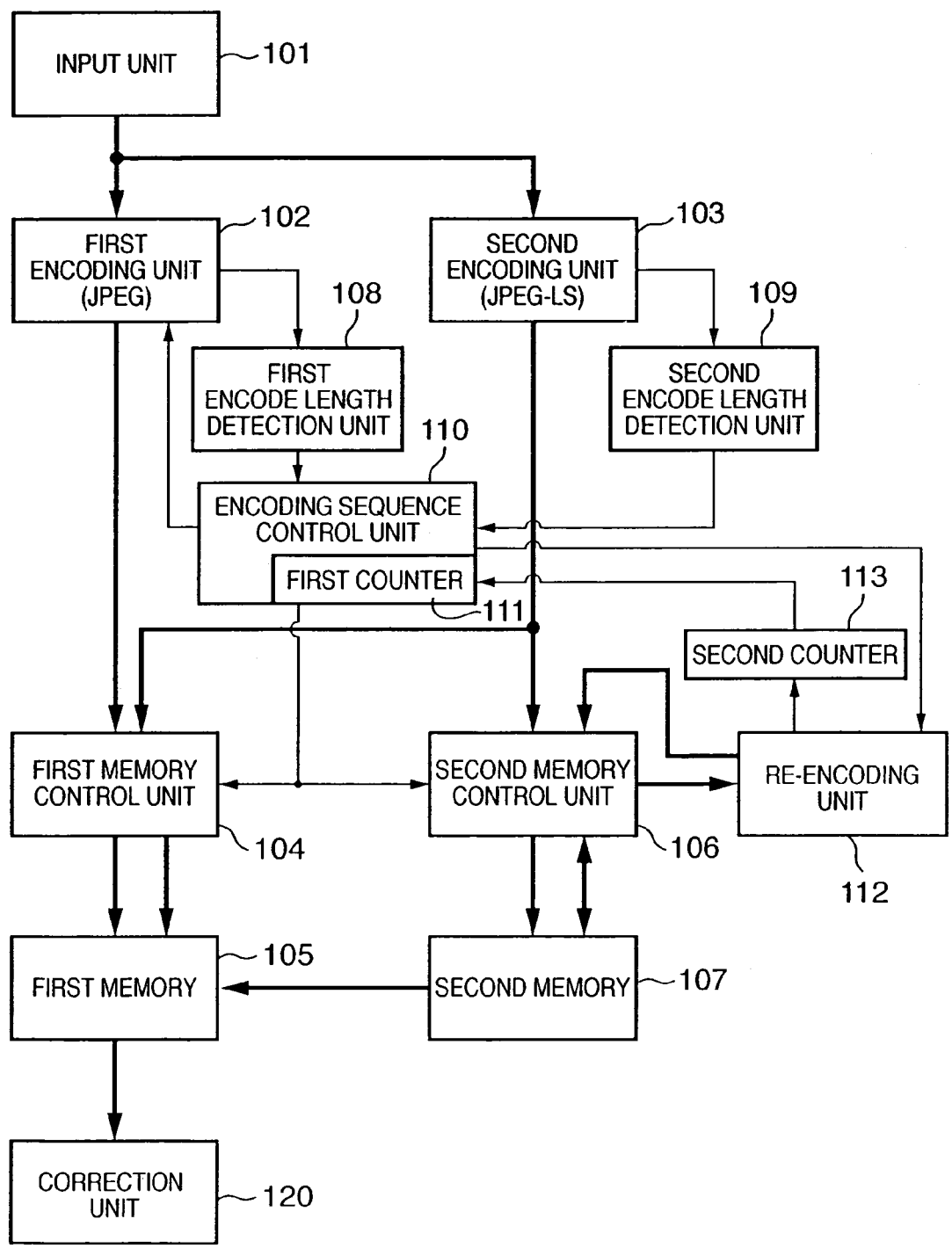
FIG. 1 is a block diagram showing an encoding unit according to the first embodiment.

FIG. 1 is a block diagram showing the encoding unit 6 according to the embodiment. Each unit in FIG. 1 will be briefly explained.

An input unit 101 incorporates a line buffer memory for a plurality of lines. As described above, the input unit 101 receives image data from the document reading unit 3 or rendering unit 4 via the selector 5 in the raster order, stores the image data in the internal line buffer, and outputs it by a block of N×M pixels (in the embodiment, a block of 8×8 pixels).

A first encoding unit 102 is a lossy encoding unit which compression-encodes each pixel block input from the input unit 101 in accordance with a parameter which influences the compression ratio, and outputs the result (encoded data). An identification bit representing that data has been encoded by the first encoding unit 102 is added at the start of the encoded data.

The image encoding unit 102 according to the embodiment adopts JPEG encoding (lossy encoding). More specifically, image data corresponding to 8×8 pixels is orthogonally transformed, quantized using a quantization step (to be described later), and undergoes a Huffman encoding process. The quantization step determines a generated amount of encoded data, and is set by an encoding sequence control unit 110 as an encoding parameter which influences the compression ratio. JPEG encoding is known as a technique suitable for natural pictures.

Figure 21:
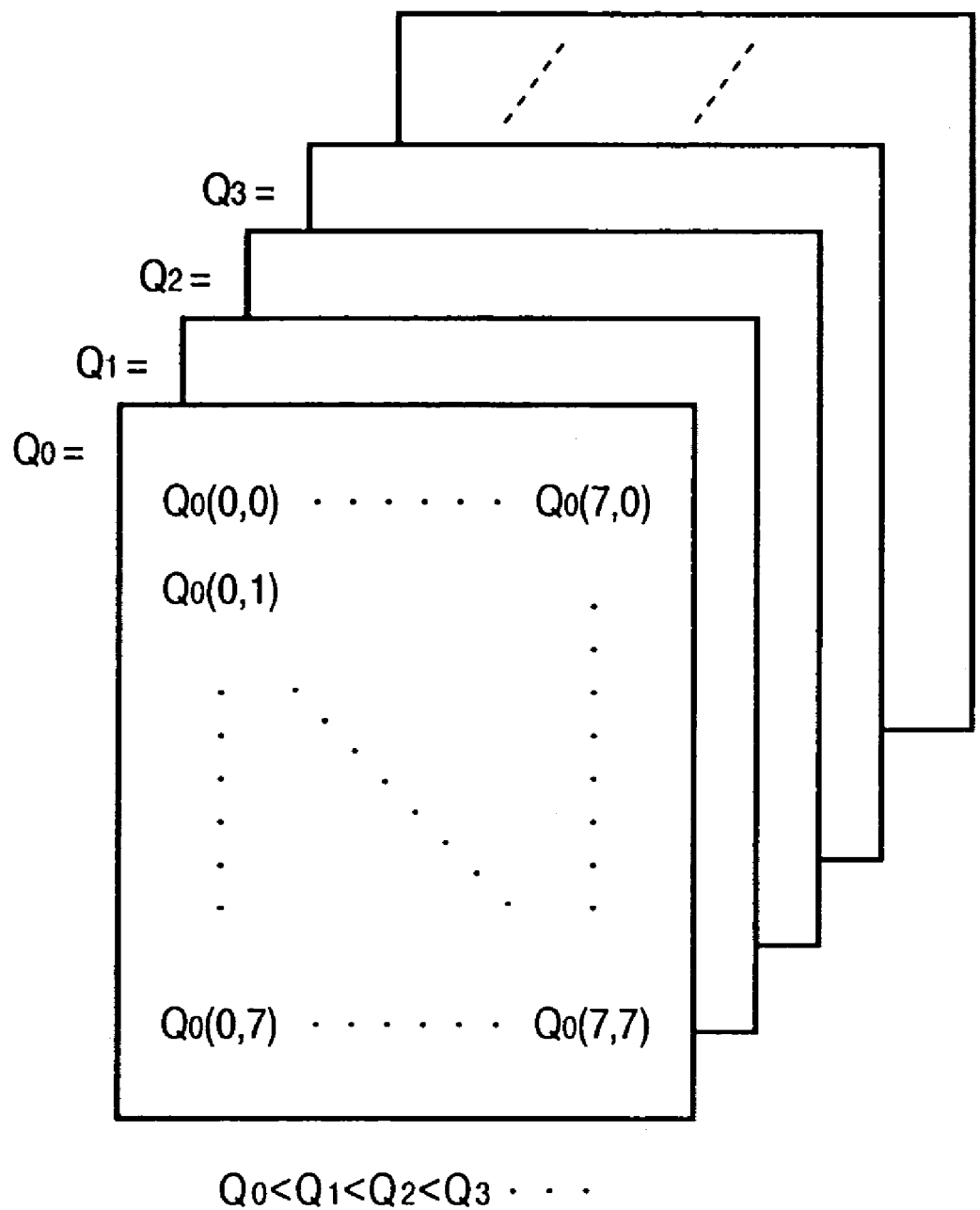
FIG. 21 is a view showing a quantization matrix table used in the embodiment.

FIG. 21 shows quantization matrix tables Q0, Q1, and Q2 which are used to quantize the frequency coefficient after DCT transformation (which are stored and held in the encoding sequence control unit 110). Values Qi(0,0) to Qi(7,7) (i=0, 1, 2, . . . ) in the quantization matrix table mean quantization step values. Quantization step values substantially satisfy $Q0<Q1 \leq Q2$ . . . . As the quantization step value increases, a possible range of the frequency coefficient value after quantization narrows, and the compression ratio increases.

A second encoding unit 103 is a lossless encoding unit, unlike the first encoding unit 102. Because of lossless encoding, the decoding result is identical to an image before encoding, and the image quality does not degrade in principle. In the embodiment, the second encoding unit 103 adopts JPEG-LS.

"JPEG" is prefixed to JPEG-LS, but its algorithm is completely different from lossy encoding "JPEG" which is employed in the first encoding unit. JPEG-LS encoding is suited to character/line images and computer graphics. When such an image is encoded, this technique can generate encoded data which is smaller than a quantization step "1" (substantially lossless) given to lossy encoding "JPEG", and also a relatively small quantization step value such as "2" or "3".

At substantially the same timing as that of the first encoding unit 102, the second encoding unit 103 encodes the same pixel block and outputs encoded data. In outputting encoded data, the second encoding unit 103 adds at the start of the encoded data an identification bit representing that the data has been encoded by the second encoding unit 103.

A first encode length detection unit 108 detects the total length (to be simply referred to as an encode data length hereinafter) of encoded data for one pixel block that is output from the first encoding unit 102 and contains one bit serving as an identification bit. The first encode length detection unit 108 then outputs the detected length to the encoding sequence control unit 110. A second encode length detection unit 109 detects the encode data length (including one bit serving as an identification bit) of one pixel block output from the second encoding unit 103, and outputs the detected length to the encoding sequence control unit 110.

The encoding sequence control unit 110 controls the encoding unit 6 in the embodiment, and incorporates a first counter 111. The counter is reset at the start of encoding one page, compares an encode length from the first encode length detection unit 108 and that from the second encode length detection unit 109, selects data of a shorter encode length, and accumulates (or adds) the data. Since a shorter encode length is proved, the encoding sequence control unit 110 requests a first memory control unit 104 to store encoded data of the shorter encode length.

The first memory control unit 104 writes/deletes encoded data in/from a first memory 105 under the control of the encoding sequence control unit 110. The first memory 105 stores encoded data which is finally defined upon the completion of 1-page encoding, and stores encoded data to be output to the secondary storage device 7.

A second memory control unit 106 performs a process of storing encoded data generated by the second encoding unit 103 in a second memory 107, and a process of reading out encoded data from the second memory 107 under the control of the encoding sequence control unit 110. The second memory 107 is used as a work area when 1-page image data is encoded.

A re-encoding unit 112 re-encodes encoded data in a range designated by the encoding sequence control unit 110 out of encoded data (losslessly encoded data) stored in the second memory 107. The re-encoding unit 112 has, e.g., an arrangement in FIG. 20.

Since the second memory 107 stores data encoded by the second encoding unit (JPEG-LS encoding unit) 103, the encoded data is decoded (reconstructed) into a pixel block of an original image by a JPEG-LS decoding unit 112a. A JPEG encoding unit 112b JPEG-encodes (lossily encodes) the reconstructed pixel block in accordance with a quantization matrix table set by the encoding sequence control unit 110. A selector 112c selects and outputs a smaller one of the lossily encoded data output from the JPEG encoding unit 112b and the losslessly encoded data before re-encoding. This process is repetitively executed for a range designated by the encoding sequence control unit 110. A second counter 113 is reset at the start of re-encoding by the re-encoding unit 112, and accumulates and counts an encoded data amount generated by the re-encoding unit 112. Upon the completion of re-encoding in the set range, a value (encoded data amount generated by re-encoding) held in the second counter is output to the encoding sequence control unit 110.

The arrangement in FIG. 1 has been described, and the overall process will be explained in more detail.

When encoding of 1-page image data starts, a target data amount corresponding to an input image size is set by the control unit 1 in the encoding sequence control unit 110. The encoding sequence control unit 110 sets the initial quantization matrix table Q0 (encoding parameter corresponding to the highest image quality and lowest compression ratio) for the first encoding unit 102, and clears the first counter 111 to 0. The encoding sequence control unit 110 causes the first and second encoding units 102 and 103 to start an encoding process. The following description pertains to input and an encoding process of 1-page image data.

The first and second encoding units 102 and 103 output encoded data of the same pixel block. The first and second encode length detection units 108 and 109 detect and output the encode lengths of the encoded data. The encoding sequence control unit 110 selects a shorter encode length, and causes the first counter 111 to add it. At this time, the encoding sequence control unit 110 outputs to the first memory control unit 104 a control signal representing which of the encode lengths has been selected. When the two encode lengths are equal to each other, the encoding sequence control unit 110 outputs a control signal representing that losslessly encoded data has been selected.

The first memory control unit 104 receives the control signal from the encoding sequence control unit 110, selects encoded data whose encode length is determined to be shorter, and stores the encoded data in the first memory 105.

As a result, the first memory 105 stores encoded data of a shorter encode length for each pixel block of image data. That is, the first memory 105 stores both losslessly encoded data and lossily encoded data. To the contrary, the second memory 107 stores only losslessly encoded data.

It should be noted that the first counter 111 stores information on the total code amount of encoded data stored in the first memory 105.

While the encoding process for a 1-page image progresses, the encoding sequence control unit 110 monitors the value of the first counter 111, i.e., the total amount of encoded data stored in the first memory 105, and determines whether the total amount has exceeded (or has reached) the target data amount. If the encoding sequence control unit 110 determines that the value (total code amount) held by the first counter 111 has exceeded the target data amount, the encoding sequence control unit 110 executes the following process.

Step 1). The encoding sequence control unit 110 outputs a control signal to the first memory control unit 104 so as to discard data stored in the first memory 105. Based on the control signal, the first memory control unit 104 discards the stored encoded data by clearing the memory address counter or clearing the encoded-data management table.

Step 2). The encoding sequence control unit 110 clears the first counter 111 to 0 (input of an image from the input unit 101 continues).

Step 3). The encoding sequence control unit 110 updates the quantization matrix table in order to cause the first encoding unit 102 to perform encoding at a compression ratio higher than the current one. When the currently set quantization matrix table is Qi, the encoding sequence control unit 110 sets a quantization matrix table Qi+1. Since the quantization matrix table Q0 is set in the initial state, the quantization matrix table Q1 is set when it is determined for the first time that the total amount has exceeded the target amount.

Step 4). The encoding sequence control unit 110 clears the second counter 113 to 0, sets the quantization matrix table Qi+1 for the re-encoding unit 112, and starts re-encoding of encoded data stored in the second memory 107. Encoded data (including both losslessly and lossily encoded data) obtained by re-encoding are stored again in the second memory 107. The second memory 107 also stores encoded data from the second encoding unit 103, and the encoded data from the first and second encoding units 102 and 103 are distinctively stored.

Step 5). Upon the completion of re-encoding, the encoding sequence control unit 110 transfers the encoded data stored "again" in the second memory 107 to the first memory 105, and deletes the data from the second memory (encoded data from the encoding unit 103 is not deleted). The encoding sequence control unit 110 reads out the value of the second counter 113, and adds it to the first counter 111. As a result, the first counter 111 indicates again the total amount of encoded data stored in the first memory.

Whether the re-encoding process has ended is detected by the second memory control unit 106. If no data to be read out for the re-encoding process is detected, the second memory control unit 106 notifies the encoding sequence control unit 110 of the end of the re-encoding process. In practice, the encoding process is completed after not only the read process by the second control unit 106 but also the process of the re-encoding unit 112 end.

If the encoding sequence control unit 110 determines that the total encoded data amount has exceeded the target data amount again before input and encoding of a 1-page image are completed, the encoding sequence control unit 110 executes steps 1 to 5 above. Finally, the first memory 105 stores encoded data of the target data amount or less.

Figure 9:
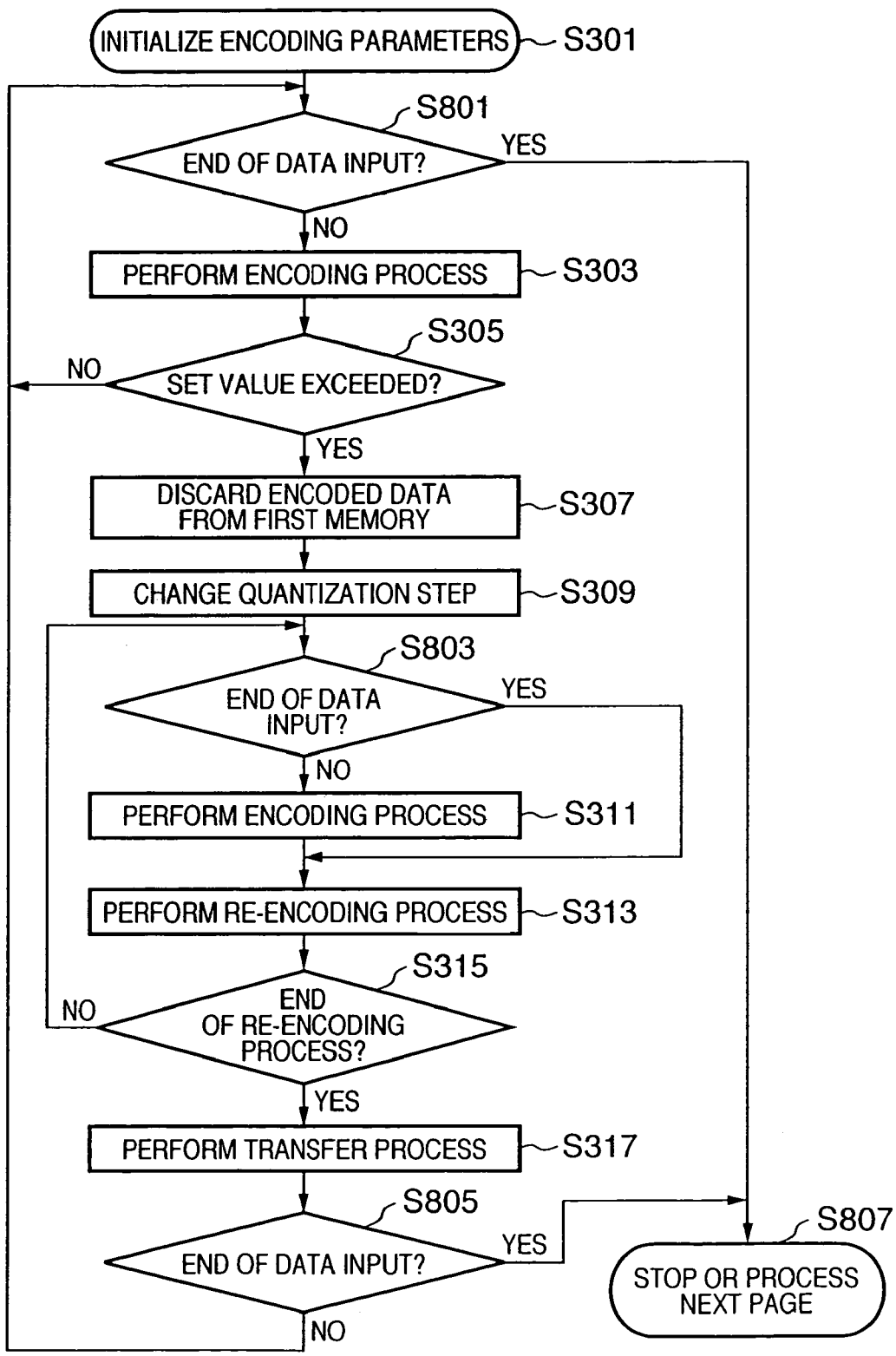
FIG. 9 is a flowchart showing details of the process according to the first embodiment.

The process sequence of the encoding sequence control unit 110 in the arrangement of FIG. 1 is shown in the flowchart of FIG. 9. For descriptive convenience, this process will be described first with reference to the simplified flowchart of FIG. 3.

Figure 3:
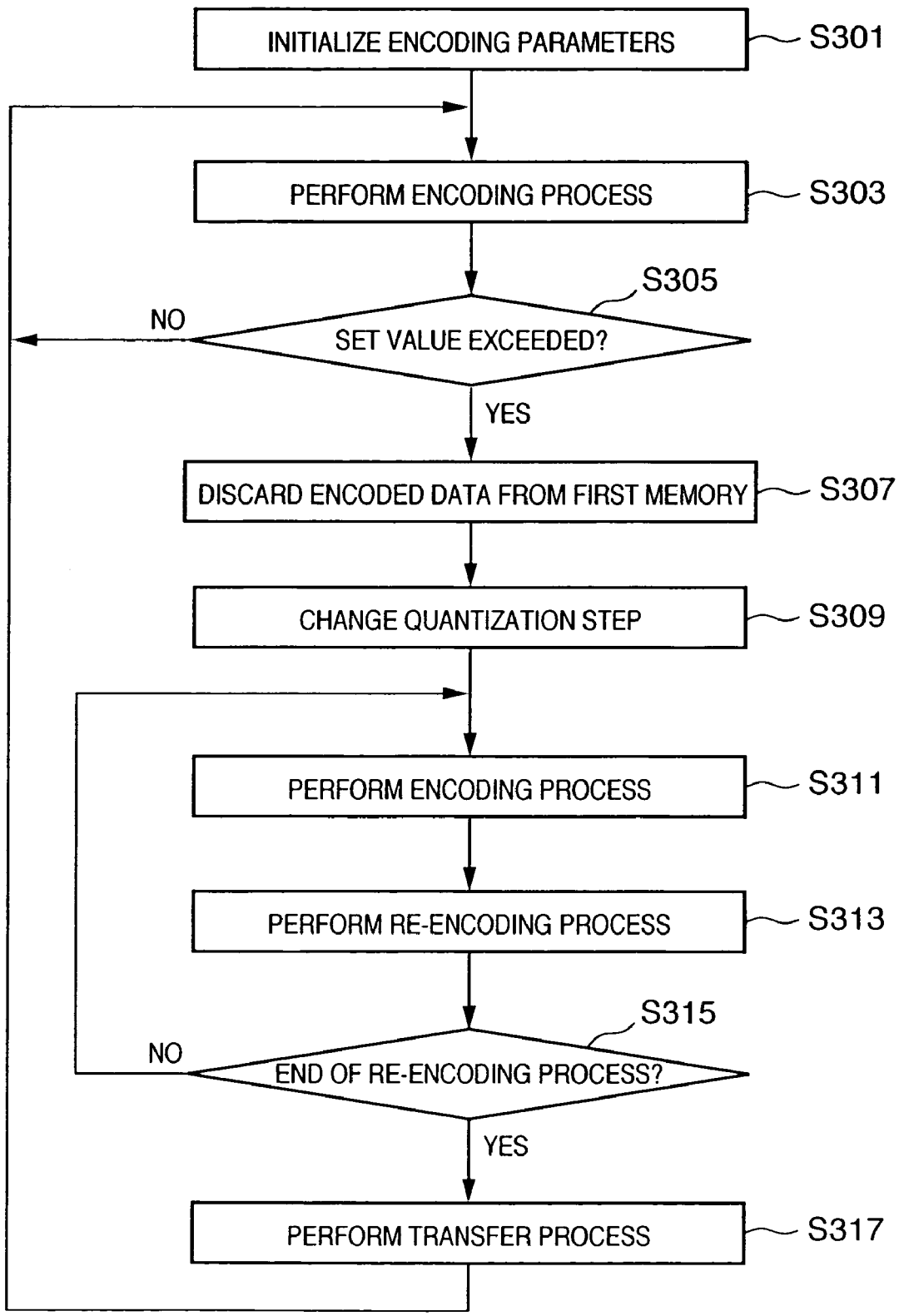
FIG. 3 is a flowchart showing a simplified flow of a process according to the first embodiment.

The flowchart of FIG. 3 is roughly divided into the following three process phases:

(1) an encoding phase,
(2) an encoding/re-encoding phase, and
(3) a transfer phase.

FIGS. 4 to 8 visually and simply show how image data, encoded data, and the like flow and are processed and how they are stored in the memories in the respective process phases.

Figure 4:
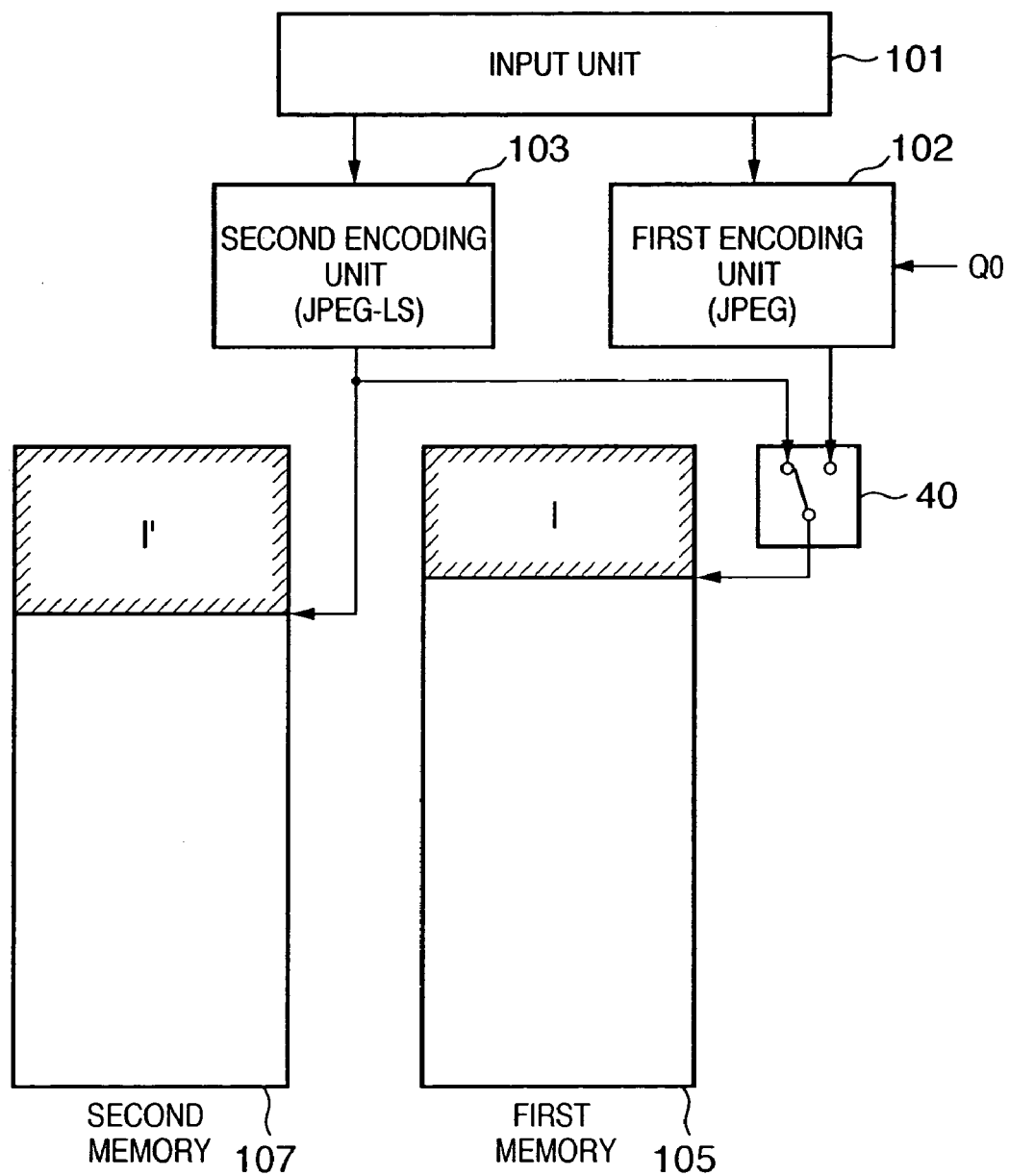
FIG. 4 is a view showing a data flow and memory contents in the encoding phase in an initial state according to the first embodiment.

FIG. 4 shows the initial state of the encoding phase corresponding to steps S303 and S305 in the flowchart of FIG. 3. Note that a switch 40 in FIG. 4 selects encoded data of a shorter encode length among encoded data from the first and second encoding units 102 and 103. The switch 40 is implemented by the functions of the encoding sequence control unit 110 and first memory control unit 104. The first memory 105 stores encoded data of a shorter encode length among encoded data from the two encoding units. This maintains a relation in which a data amount I in the first memory 105 is smaller than a data amount I' in the second memory 107.

Figure 5:
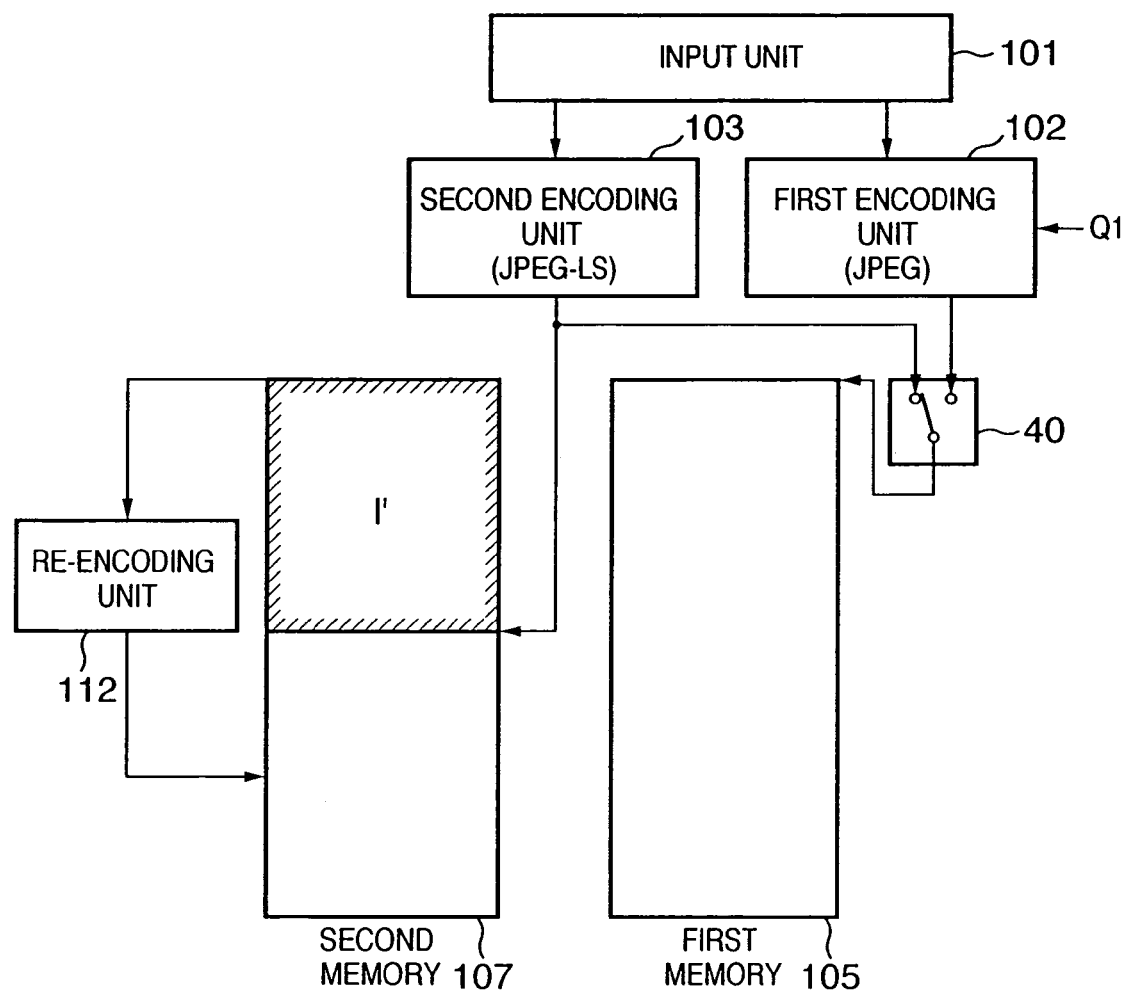
FIG. 5 is a view showing a data flow and memory contents at the start of the encoding/re-encoding phase according to the first embodiment.

FIG. 5 shows a state when the quantization matrix table is changed in step S309. As shown in FIG. 5, no encoded data is stored in the first memory 105.

Figure 6:
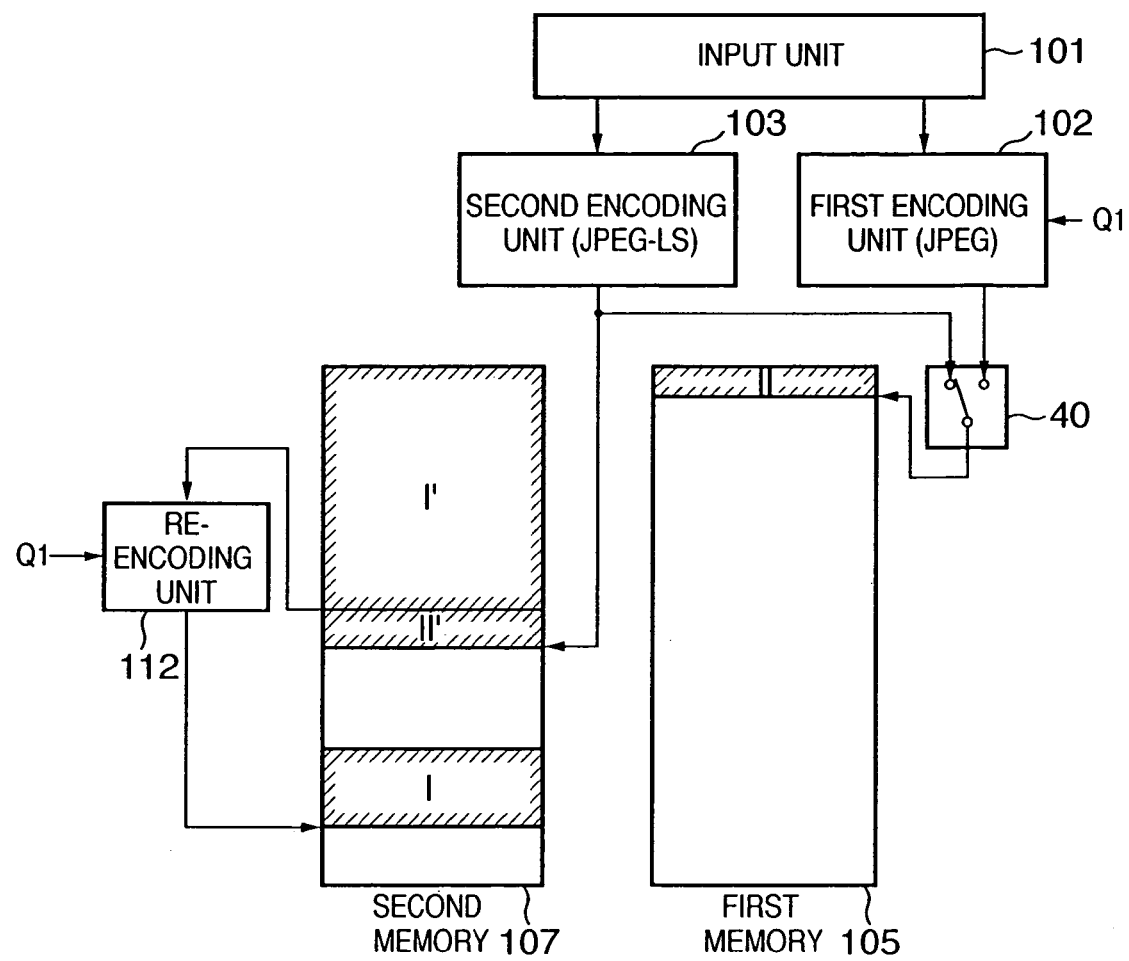
FIG. 6 is a view showing a data flow and memory contents at the end of the encoding/re-encoding phase according to the first embodiment.
Figure 7:
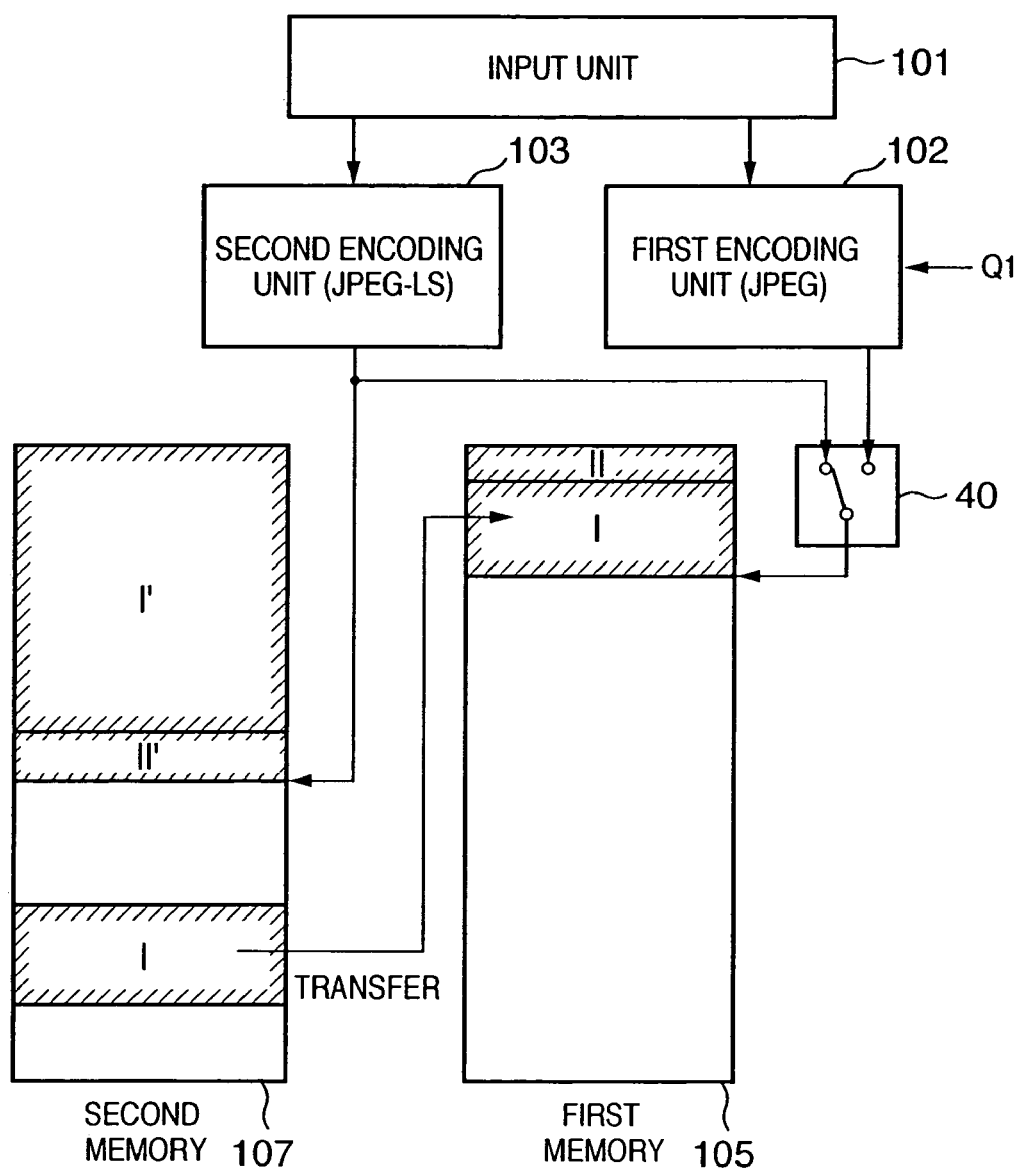
FIG. 7 is a view showing a data flow and memory contents in the transfer phase according to the first embodiment.
Figure 8:
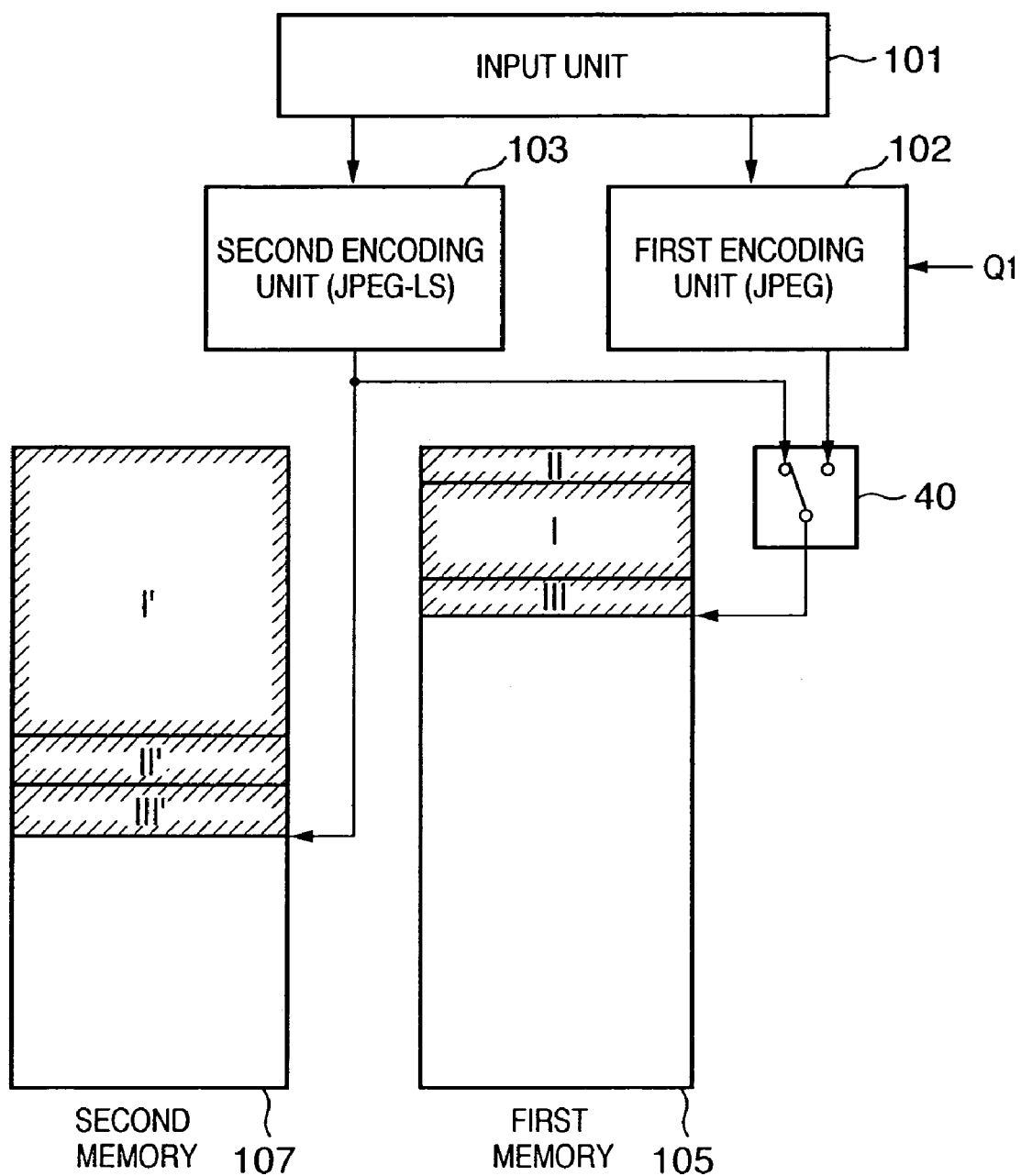
FIG. 8 is a view showing a data flow and memory contents in the encoding phase after the transfer phase according to the first embodiment.

FIG. 6 shows the process state of the encoding/re-encoding phase corresponding to steps S311 to S315. FIG. 7 shows the process state of the transfer phase corresponding to step S317. FIG. 8 shows the process state of the encoding phase after the transfer phase. Each phase will be described below.

<<Encoding Phase>>

An encoding process of 1-page image data starts from an encoding parameter initialization process (step S301). Step S301 is a process of setting the quantization matrix table Q0 to be applied to the first encoding unit 102, and a target data amount for an encoded data amount that is uniquely determined from an image size (paper size read by the input unit 101 for page description rendering or the like) subjected to an encoding process.

In step S303, an encoding process starts by the first and second encoding units 102 and 103. Consequently, the first memory 105 stores, for each pixel block, encoded data of a shorter encode length among encoded data from the first and second encoding units 102 and 103. The encoded data amount in the first memory 105 is counted by the first counter, as described above. The second memory 107 stores encoded data from the second encoding unit 103. FIG. 4 shows this state. The area I representing a data amount in the first memory 105 is at least equal to or narrower than the area I' representing a data amount in the second memory 107.

In step S305, it is checked whether the count value of the data amount has exceeded the target value. If NO in step S305, the first and second encoding processes in step S303 continue. This is the encoding phase in the initial state.

<<Encoding/Re-encoding Phase>>

As the encoding process proceeds and the total code data amount in the first memory exceeds the target amount, encoded data in the first memory 105 is discarded in step S307. In step S309, the quantization matrix table Q0 set for the first encoding unit 102 is updated to the next quantization matrix table Q1. That the total encoded data amount exceeds a target data amount means that the data amount after compression does not fall within the target amount. Since it is useless to continue the encoding process by using the same quantization step, the quantization step is changed to the quantization step Q1 which is larger in quantization step width than the quantization step Q0.

After the quantization step is changed, the encoding process by the first and second encoding units 102 and 103 resumes in step S311. The quantization matrix table Q1 (identical to the updated quantization matrix table set for the first encoding unit) is set for the re-encoding unit 112. Re-encoding of the encoded data amount in the second memory starts, and the re-encoding result is stored again in the second memory. This state is shown in FIG. 5.

In step S315, the flow waits until the re-encoding process is completed.

<<Transfer Phase>>

FIG. 6 shows the storage state of encoded data in the first and second memories 105 and 107 when it is determined in step S315 that re-encoding is completed. In FIG. 6, areas II and II' represent encoded data corresponding to newly input image data during the re-encoding process. The area I represents the result (including both lossily and losslessly encoded data) of re-encoding encoded data stored in the area I'.

In step S317, as shown in FIG. 7, re-encoded data (area I in FIG. 7) stored in the second memory 107 is transferred to the first memory 105. Upon the completion of transfer, the data in the area I of the second memory 107 is discarded (or overwrite is permitted).

After the end of the transfer phase, the flow returns to the encoding phase in steps S303 and S305. As a result, as shown in FIG. 8, encoded data III and III' of newly input image data are stored in the respective memories. In this encoding phase, unlike the encoding phase in the initial state (FIG. 4), the quantization step used for encoding by the first encoding unit 102 is changed from Q0 to Q1, and the order of encoded data stored in the first memory 105 does not coincide with the image input order. Except these differences, the encoding phase immediately after the transfer phase and that in the initial state can be regarded to be identical. Since the order of encoded data is not always time series, as shown in FIG. 8, the storage address in each phase is separately stored. When an encoding process for one page is completed and the encoded data is to be output to the secondary storage device 7 via a correction unit 120 (to be described in detail later), the encoded data are read out and output in time series from the first memory 105.

By repeating the three, encoding, encoding/re-encoding, and transfer phases, codes obtained by compressing 1-page image data into a set data amount or less can be finally stored in the first memory 105. The input unit 101 only continues input operation until the end of a series of processes. That is, no image need be input again from the beginning.

The flowchart shown in FIG. 3 describes only processes corresponding to the respective phases shown in FIGS. 4 to 8 for easy understanding. In practice, however, input of 1-page image data comes to an end in some phase. Depending on the phase where the input operation comes to an end, the subsequent process slightly differs. The flowchart of FIG. 9 shows the flow of a process in consideration of this. The flowchart of FIG. 9 is based on the relationship between the completion of input of 1-page image data and each kind of process described with reference to FIG. 3. In this case, steps S801, S803, S805, and S807 are added to the flowchart of FIG. 3.

In steps S801, S803, and S805, it is checked whether input of 1-page image data from the input unit 101 is completed in the encoding phase, encoding/re-encoding phase, and transfer phase.

If it is detected that input of 1-page image data is completed in the encoding phase and transfer phase (steps S801 and S805), the flow advances to step S807 to terminate a compression encoding process for the page. If there is image data of one page or more to be compressed next, the compression encoding process for the next 1-page image data starts. If there is no data to be compressed, a halt condition is set.

If the end of input of 1-page image data is detected in the encoding/re-encoding phase (step S803), the operation of the first and second encoding units 102 and 103 need be stopped until there is no image data to be re-encoded. For this reason, the encoding process in step S311 is passed, and only the re-encoding process is continued in step S313 to suppress, within a predetermined encoded data amount, image data which have already been encoded by the first and second encoding units 102 and 103. If the subsequent transfer process is not terminated after the re-encoding process is terminated for all data, the overall encoded data of 1-page image data is not collected in the first memory. The re-encoding process and subsequent transfer process must be continuously performed even after the end of input of 1-page image data. In this case, if it is detected in step S315 that the re-encoding process is terminated for all data, the encoded data stored in only the second memory 107 is transferred to the first memory during the encoding/re-encoding phase (step S317). Thereafter, the end of input of 1-page image data is detected in step S805, and the flow advances to step S807 (advances to a correction process).

The above description has been made for the contents of the encoding process by the encoding unit 6 according to the embodiment, and is also a description of the operation in FIG. 9.

As has been described above, encoded data of a target encoded data amount or less can be generated without interrupting input of a 1-page image and inputting again it while different encoding techniques provided by the first encoding unit 102 which generates lossily encoded data and the second encoding unit 103 which generates losslessly encoded data are adopted.

It should be noted that the embodiment uses the two, JPEG and JPEG-LS techniques. JPEG encoding is known to have a high compression ratio for natural pictures. To the contrary, JPEG-LS encoding can obtain a high compression ratio for character/line images, and faithfully reconstruct an original image because of lossless encoding.

For this reason, the image encoding unit 6 according to the embodiment can be expected to provide the following operation effects. In the following description, a target code data amount is set on the assumption that one entire page is a natural picture.

1. For a general document which is formed from only characters, JPEG-LS-encoded data (losslessly encoded data) from the second encoding unit 103 is highly likely to be selected as encoded data of each pixel block that is to be stored in the first memory 105. Also, it can be expected that the compression ratio at this time is very high and encoding is completed while the total encoded data amount is suppressed within a target code amount. Because of losslessly encoded data, the print result is faithful to an original image, and the image quality of the print result becomes substantially equal to that obtained without the mediacy of encoding.

2. When a document is formed from only a natural picture, JPEG-encoded data (lossily encoded data) from the first encoding unit 102 is highly likely to be selected as encoded data which is to be stored in the first memory 105. Also, the total data amount is highly likely to exceed a target data amount several times. However, the original is a natural picture, tone reproduction is a factor which determines the image quality, and encoded data can be printed at a sufficient image quality.

3. When a document contains both a natural picture and characters, JPEG-LS-encoded data is highly likely to be selected in the character/line image area, and JPEG-encoded data is highly likely to be selected for the natural picture. In the character/line image area, JPEG-LS encoding having a high compression ratio is selected at high possibility. This means that an encoded data amount assigned to the natural picture area can be increased at a ratio equal to or more than the ratio of the natural picture area and character/line image area which occupy one page. In other words, it can be expected that the encoding process is completed while the quantization step value of a photographic image is kept relatively small. Degradation of the image quality in the character/line image area and also the photographic image area can be suppressed.

4. It is also advantageous to implement these operation effects 1 to 3 without any special circuit configuration such as an area determination circuit.

Figure 13:
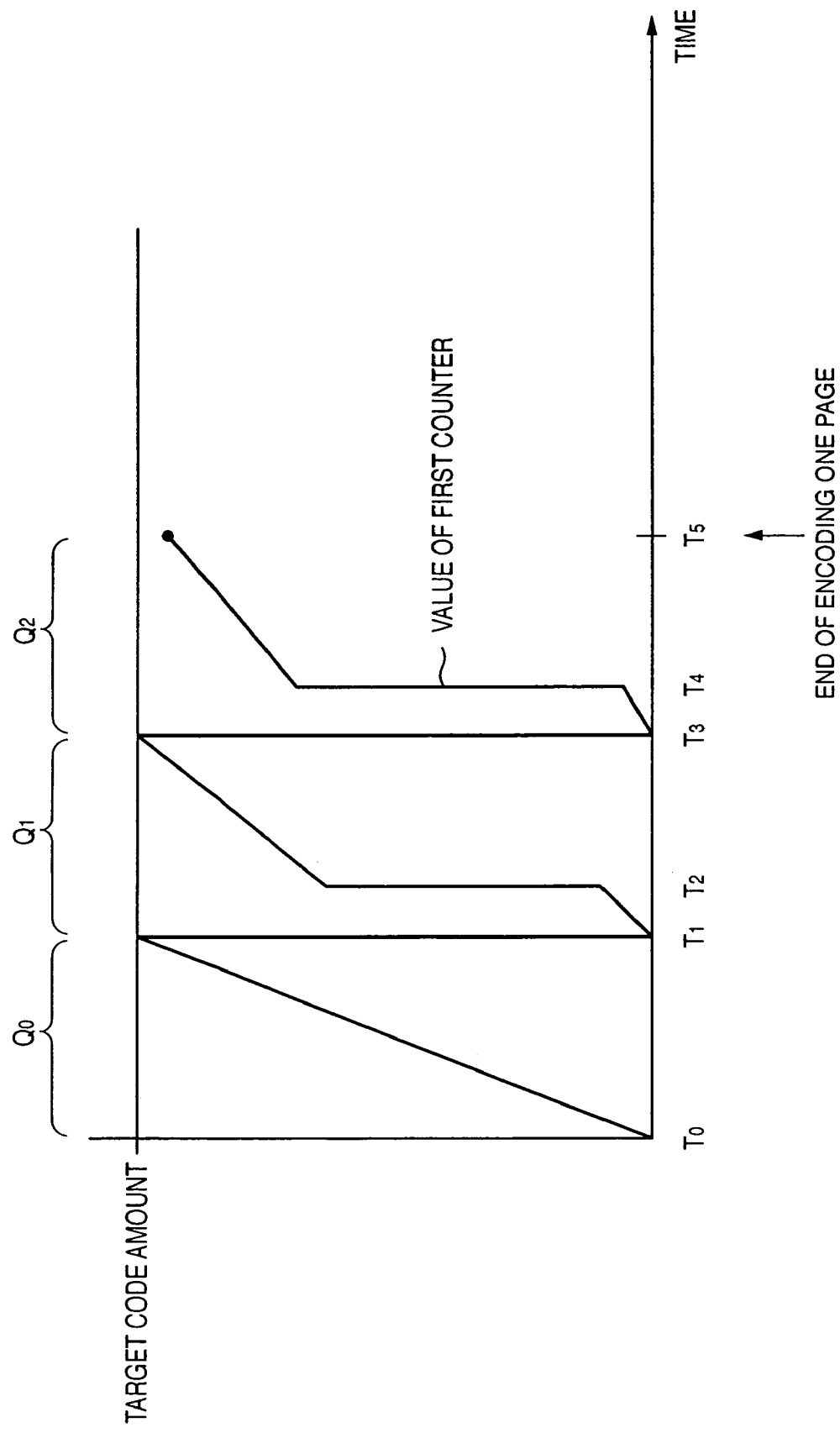
FIG. 13 is a timing chart showing an example of transition of the value of the first counter according to the first embodiment.

FIG. 13 shows an example of transition of the first counter 111 (encoded data amount) along the time axis.

In FIG. 13, input of a document image starts at timing T0, and is completed at timing T5. Timing T5 is fixed as far as the size of an input document is fixed. A process at each timing will be explained.

Timing T0:

Timing T0 is an image input start (encoding start) timing. At this time, the quantization matrix table Q0 is set as an initial value for the first encoding unit 102, and the first counter 111 is initialized to "0". After that, as input and encoding of an image continue, the image data is encoded, and the count value of the first counter 111 gradually increases.

Timing T1:

At timing T1, the encoded data amount of image data reaches a target code amount. At this time, encoded data of image data in the first memory 105 is discarded, the first counter 111 is cleared to 0, and the quantization matrix table set for the first encoding unit 102 is updated to Q1. The quantization matrix table Q1 is also set for the re-encoding unit 112, and the re-encoding process starts.

Timing T2:

At timing T2, the re-encoding and transfer processes are completed. Upon the completion of re-encoding, re-encoded data is transferred from the second memory 107 to the first memory 105, and the value of the second counter 113 representing the re-encoded data amount is added to the first counter 111. Consequently, the first and second memories 105 and 107 store encoded data equivalent to data obtained such that image data input from the start of one page till timing T2 are encoded on the basis of the quantization matrix table Q1.

Timing T3:

At timing T3, the encoded data amount of image data reaches a target code amount again. At this time, encoded data of image data in the first memory 105 is discarded, the first counter 111 is cleared to 0, and the quantization matrix table of the first encoding unit 102 is changed to Q2. The quantization matrix table Q2 is also set for the re-encoding unit 112, and the re-encoding process starts.

Timing T4:

At timing T4, the re-encoding and transfer processes are completed. Upon the completion of re-encoding, re-encoded data is transferred from the second memory 107 to the first memory 105, and the value of the second counter 113 representing the re-encoded data amount is added to the first counter 111. As a result, the first and second memories 105 and 107 store encoded data equivalent to data obtained such that image data input from the start of one page till timing T2 are encoded on the basis of the quantization matrix table Q2.

Timing T5:

At timing T5, input of the 1-page document is completed. In this case, the first memory 105 stores encoded data of the 1-page image, and outputs the result to the secondary storage device 7 via the correction unit 120. At this time, the correction unit 120 is notified of a quantization matrix table finally used by the first encoding unit 102 (the reason will be described later).

To read the second document image, the process is repeated from timing T1.

Depending on an image, the value of the first counter 111 may exceed a target amount immediately before timing T5 at which input of a document image is completed. In this case, the re-encoding and transfer processes are done after timing T5. A condition that encoded data stored in the first memory 105 is output to the secondary storage device 7 is that input of a document image is completed and encoding (re-encoding and transfer) is also completed.

An encoded data amount to be re-encoded by the re-encoding unit 112 tends to increase as the number by which the value of the first counter 111 exceeds a target data value increases. In other words, as the number by which the value exceeds the target value is smaller, the time taken for the encoding process is shorter.

The process of step S2 in FIG. 23 has been described. Next, the correction process of step S4 in FIG. 23 will be explained.

As described above, when an encoding process for one page is completed, encoded data of each pixel block that is stored in the first memory 105 is either lossily encoded data or losslessly encoded data, and encoded data of these two types coexist.

The embodiment exemplifies JPEG as lossy encoding and JPEG-LS as lossless encoding. Without any special area determination circuit or means, it is highly likely to employ JPEG-encoded data for a natural picture area in an input 1-page image and JPEG-LS-encoded data for a character/line image area.

However, this is a matter of probability, and it is not guaranteed that losslessly encoded data based on JPEG-LS encoding are adopted for all pixel blocks in a character/line image area and lossily encoded data based on JPEG encoding are adopted for all pixel blocks in a natural picture area. That is, encoded data of a pixel block of interest may be losslessly encoded data and those of pixel blocks around the pixel block of interest may be lossily encoded data, and vice versa. If encoded data (to be referred to as isolated encoded data hereinafter) whose encoding type is two-dimensionally isolated is generated, the pixel density and color become discontinuous at the boundary between the pixel blocks on the decoded image, resulting in an unnatural image.

This problem becomes serious particularly when a pixel block of interest has losslessly encoded data and its neighboring pixel blocks have lossily encoded data.

To solve this problem, according to the embodiment, isolated losslessly encoded data is searched for, and isolated losslessly encoded data of interest is re-encoded on the basis of a quantization matrix table notified from the encoding sequence control unit 110 to make the isolated losslessly encoded data coincide with its neighboring lossily encoded data. This process is executed by the correction unit 120, and is the process of step S4 in FIG. 23.

Figure 24:
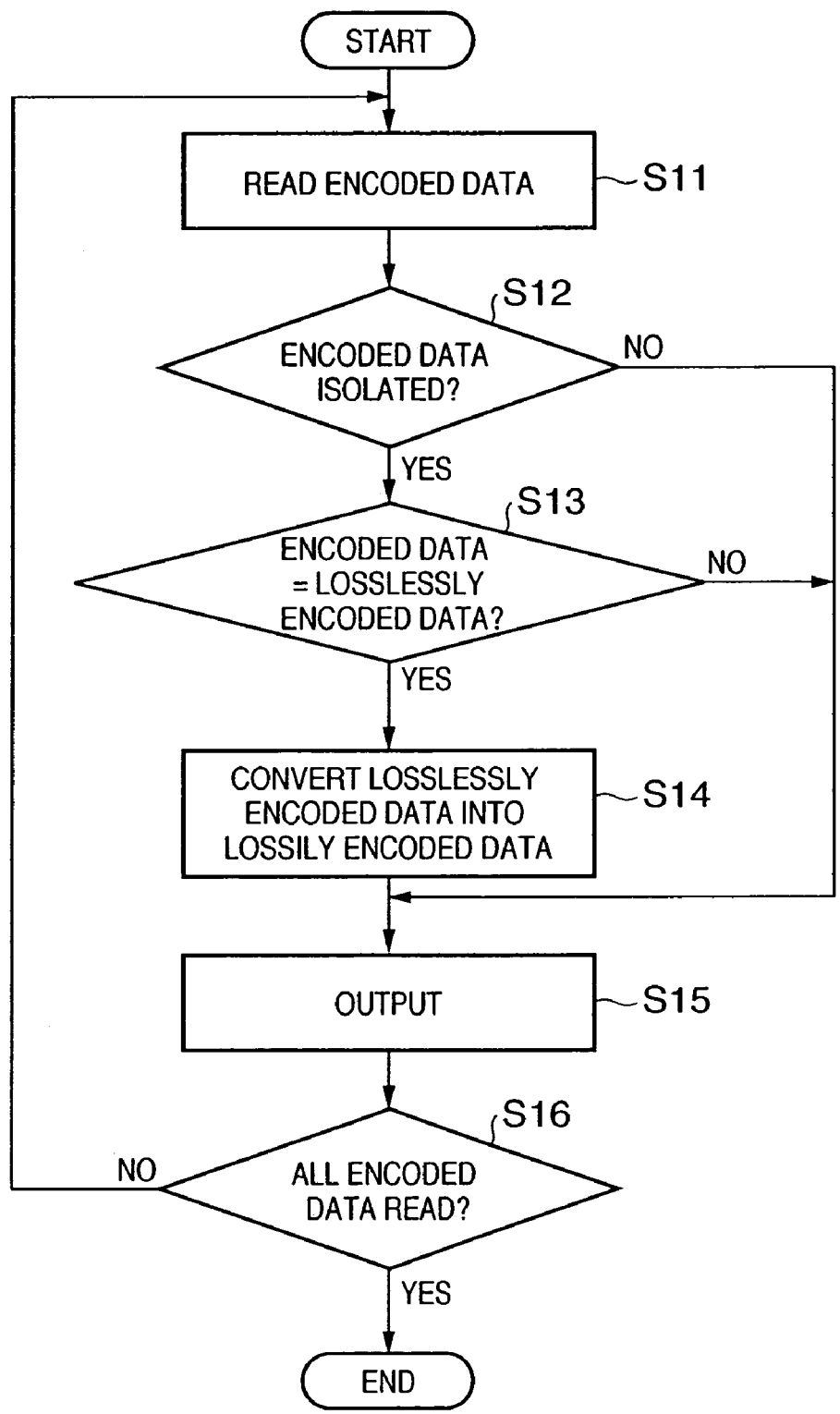
FIG. 24 is a flowchart showing the process sequence of a correction process according to the first embodiment.

FIG. 24 is a flowchart showing the process contents of the correction unit 120. The process sequence of the correction unit 120 will be explained with reference to FIG. 24.

In step S11, encoded data of interest (encoded data of one pixel block) and eight neighboring encoded data, i.e., a total of nine encoded data are read out. When encoded data of interest is positioned at the uppermost portion, left end, right end, or lowermost portion of a page, no nine encoded data can be read out. In this case, the type of encoded data of a pixel block at a virtual position is treated as the same type as that of encoded data of a pixel block of interest.

In step S12, it is determined whether encoded data of interest is isolated encoded data. As is apparent from the embodiment, whether encoded data is losslessly encoded data or lossily encoded data is determined by checking the start bit of the encoded data. If all the eight encoded data around the encoded data of interest are of the same type and the encoded data of interest is of a type different from that of the neighboring encoded data, it can be determined that the encoded data of interest is isolated encoded data.

If it is determined that the encoded data of interest is not isolated encoded data, the flow advances to step S15 to directly output the encoded data of interest to the secondary storage device 7.

If it is determined that the encoded data of interest is isolated encoded data, the flow advances to step S13 to determine on the basis of the start bit whether the encoded data of interest is losslessly encoded data.

If it is determined that the encoded data of interest is not losslessly encoded data (is lossily encoded data), the flow advances to step S15 to directly output the encoded data.

If it is determined that the encoded data of interest is losslessly encoded data, the losslessly encoded data is converted into lossily encoded data in step S14. Since the encoded data of interest is losslessly encoded data, it can be reconstructed into data of the pixel block of the original image. The decoding result is encoded (JPEG-encoded) using a quantization matrix table notified from the encoding sequence control unit 110. Then, the flow advances to step S15 to output the encoded data as a conversion result.

The above process is repeated until it is determined in step S16 that all encoded data of one page have been processed.

The first memory 105 stores encoded data of a shorter encode length among encoded data output from the two encoding units. Hence, the encoded data amount of one page that is output via the correction unit 120 does not become smaller than a data amount stored in the first memory 105 before the correction process by the correction unit 120 starts. In other words, the encoded data amount of one page that is output from the correction unit 120 may exceed a target encoded data amount set by the encoding process.

However, in the correction unit 120, encoded data whose encoding type is to be changed is only isolated losslessly encoded data. It has been confirmed that the number of isolated losslessly encoded data is only a small percentage of the total number of pixel blocks, and falls within a permissible range. In an application of the present invention to a copying machine, like the embodiment, even if the encoded data amount exceeds a target data amount, this does not influence image formation, and no problem occurs.

As described above, according to the embodiment, encoded data of a target data amount can be generated by one input operation of page image data while both lossy and lossless encoding techniques are used and generation of block noise is suppressed.

Since JPEG as lossy encoding and JPEG-LS as lossless encoding are used, encoding suited to a character/line image or natural picture can be selected without arranging any special area determination circuit. Encoded data high in both image quality and compression ratio upon decoding can be generated.

The embodiment has been described above, and the arrangement of the embodiment can be variously modified and changed. The following description is directed to another encoding unit 6 and another correction unit 120 to which the embodiment can be applied.

First Modification of Encoding Unit 6

Figure 2:
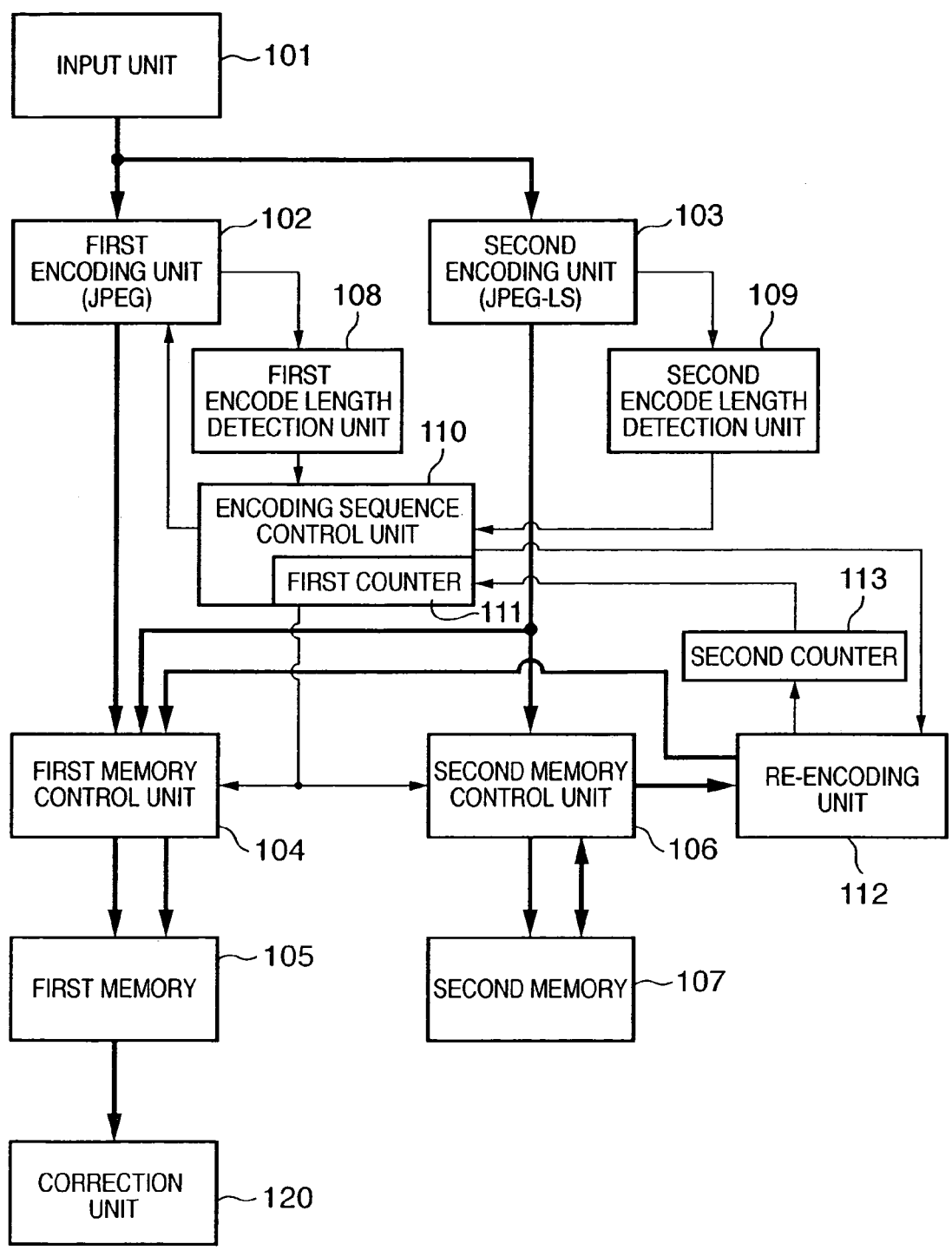
FIG. 2 is a block diagram showing a modification of the encoding unit according to the first embodiment.

FIG. 2 shows a modification of the arrangement in FIG. 1. The arrangement in FIG. 2 is different from that in FIG. 1 in that the storage destination of data re-encoded by the re-encoding unit 112 is changed to the first memory 105. The remaining arrangement is the same as that in FIG. 1.

Figure 10:
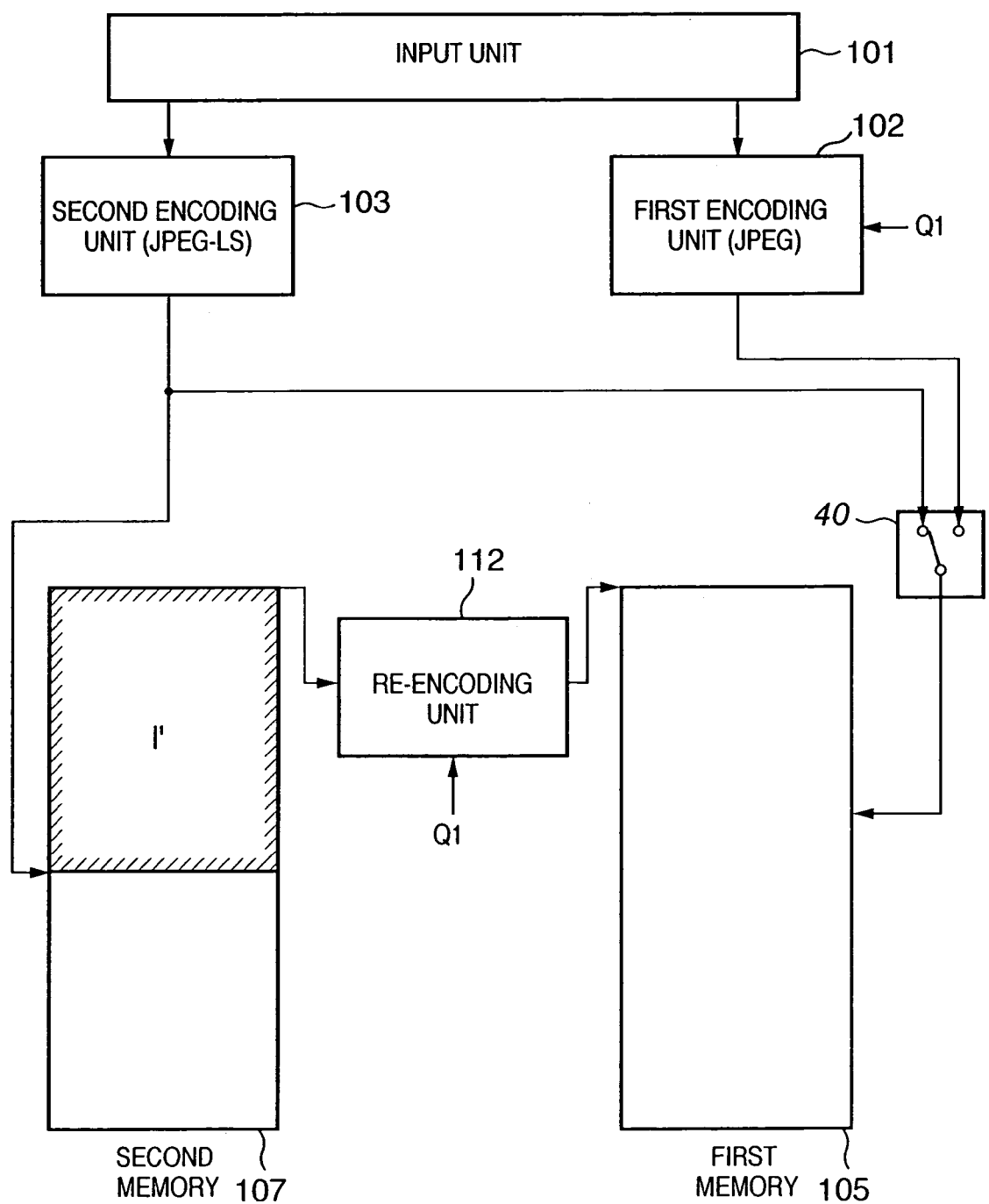
FIG. 10 is a view showing a data flow and memory contents at the start of the encoding/re-encoding phase in the arrangement of FIG. 2.

FIG. 10 shows a state in which the total encoded data amount in the first memory 105 exceeds a target data amount, data in the first memory 105 is discarded, and re-encoding of encoded data (area I' in FIG. 10) stored in the second memory 107 starts.

As shown in FIG. 10, the first memory 105 is set as the storage destination of re-encoding by the re-encoding unit 112, and re-encoding starts.

Figure 11:
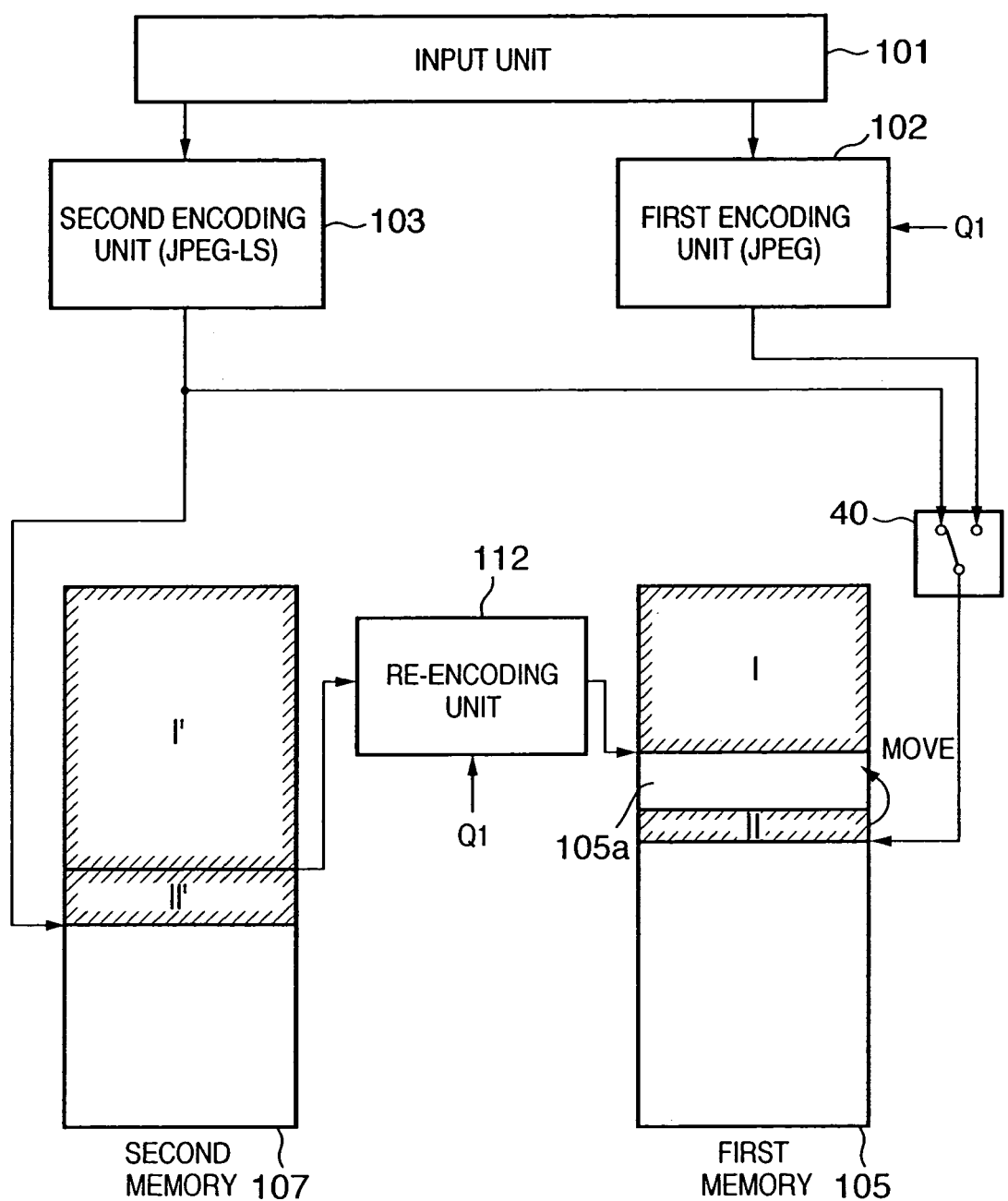
FIG. 11 is a view showing a data flow and memory contents in the transfer phase in the arrangement of FIG. 2.

FIG. 11 shows the storage state of encoded data in two memories upon the completion of re-encoding. Upon the completion of re-encoding, as shown in FIG. 11, the first memory 105 stores encoded data represented in the area I. Encoded data in the area I corresponds to encoded data obtained when image data input before it is determined that the total data amount has exceeded a target data amount is encoded on the basis of the quantization matrix table Q1.

Since input and encoding of image data are performed even during re-encoding, the areas II and II' exist, as shown in FIG. 11.

Figure 12:
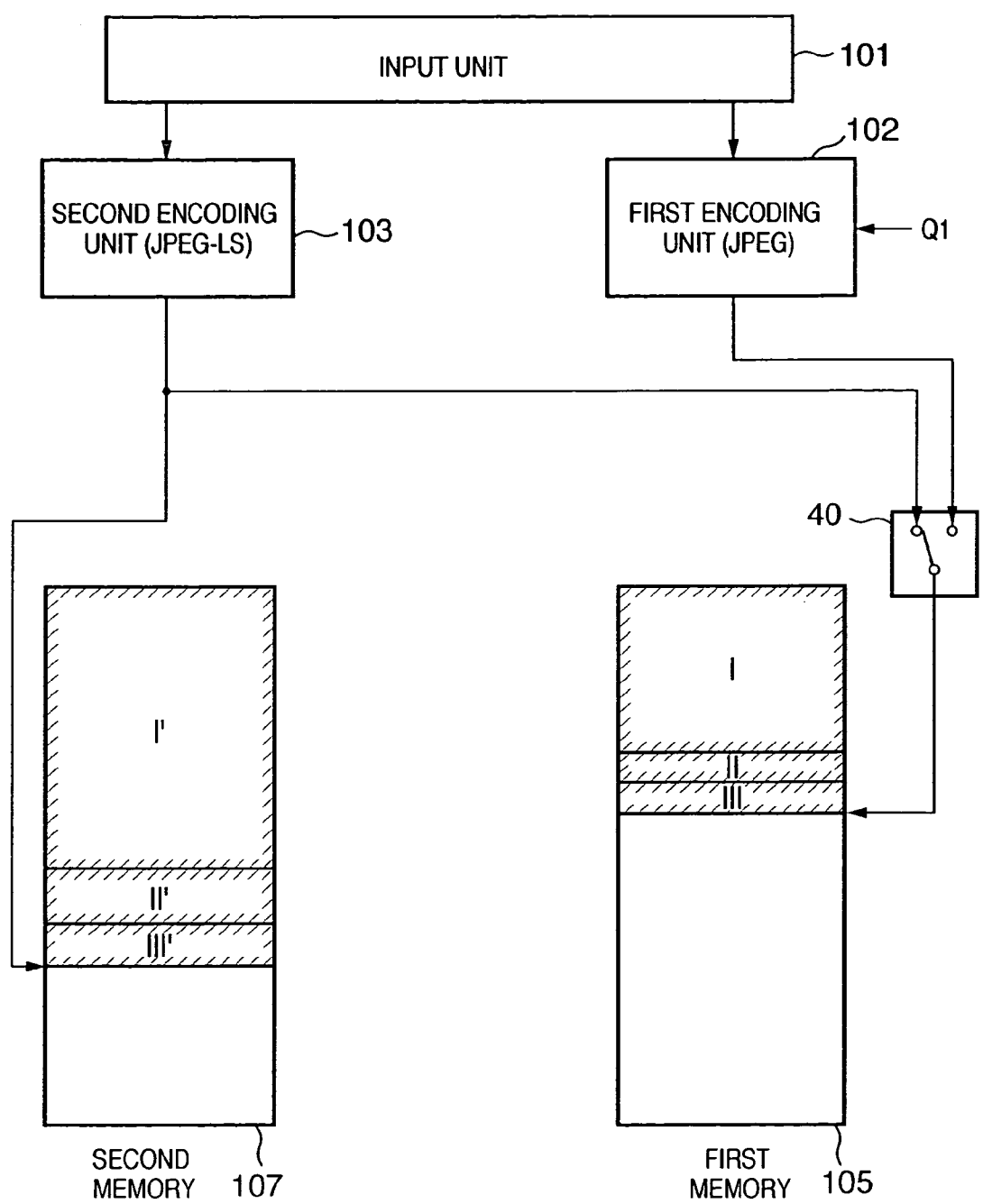
FIG. 12 is a view showing a data flow and memory contents in the encoding phase after the transfer phase in the arrangement of FIG. 2.

Since a free area 105a is ensured in the first memory 105, encoded data in the area II shown in FIG. 11 is moved to the end position in the area I. Thereafter, the encoding phase resumes, and the storage state in the memory at this time is illustrated in FIG. 12.

The advantage of the arrangement in FIG. 2 over that in FIG. 1 is that data transfer after re-encoding is substantially omitted.

This modification omits only the transfer phase, and is substantially the same as the preceding description in terms of repeating the three phases. Therefore, the contents of the process are almost the same as those in FIGS. 3 and 9, and a description thereof will be omitted. In FIG. 11, data is moved in the first memory 105 in order to eliminate the free area 105a, but internal transfer is not always necessary when a file management table for managing the connection relationship between areas, a packet management table, or the like is employed.

Second Modification of Encoding Unit 6

In the embodiment and first modification, when the encoded data amount in the first memory 105 exceeds a target data amount, encoded data in the second memory 107 is re-encoded by the re-encoding unit 112. In other words, the re-encoding unit 112 does not execute re-encoding while the encoded data amount in the first memory 105 falls within the target data amount.

An example of effectively using this period will be explained as the second modification.

The following description is directed to a process while losslessly encoded data from the second encoding unit 103 is stored in the second memory 107 when the encoded data amount in the first memory 105 falls within the target data amount, under the condition that the quantization matrix table set for the first encoding unit 102 is Qi.

Similar to the above embodiment, losslessly encoded data from the second encoding unit 103 is stored in the second memory 107. However, the re-encoding unit 112 moves up a process of sequentially reading out stored losslessly encoded data, re-encoding it on the basis of the quantization matrix Qi+1 to generate lossily encoded data, and storing the result in the second memory 107.

Figure 20:
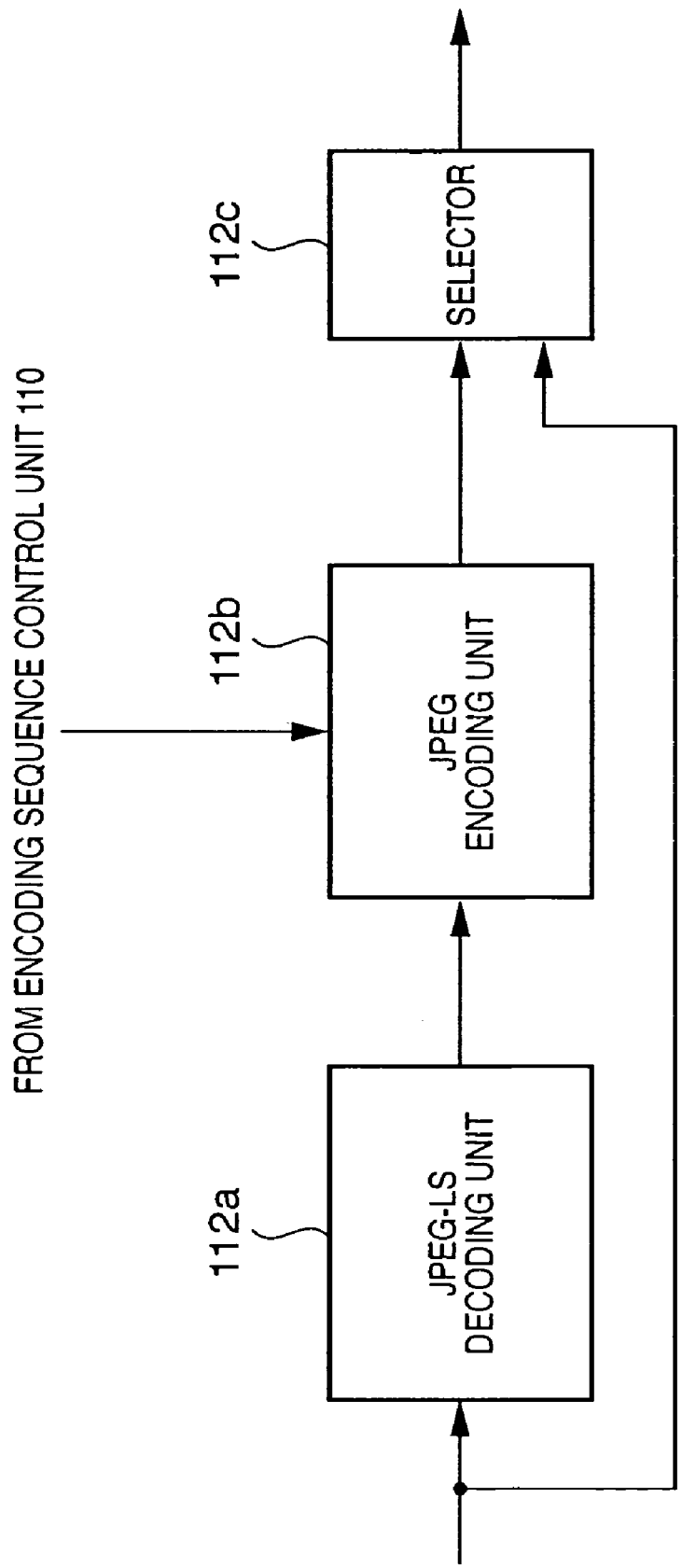
FIG. 20 is a block diagram showing a re-encoding unit according to the embodiment.

Thus, it is promised that lossily encoded data exists to a certain degree in the second memory 107 in addition to losslessly encoded data when encoded data in the first memory 105 exceeds the target data amount. For the same pixel block position, encoded data in a smaller amount is transferred to the first memory. The process in FIG. 20 is performed for only a pixel block whose lossily encoded data to be compared does not exist.

Upon the completion of transfer from the second memory 107 to the first memory 105, lossily encoded data stored in the second memory is discarded, the quantization matrix Qi+2 is set this time, and re-encoding starts. Consequently, the process associated with re-encoding can be further shortened.

Third Modification of Encoding Unit 6

In the first embodiment described above, the first counter is temporarily cleared to 0 when the encoded data amount (value of the first counter 111) exceeds a target value during input of a 1-page image. The first counter 111 holds an accurate total code amount again after re-encoding by the re-encoding unit 112 is completed. That is, the encoded data amount becomes temporarily unknown at an interval between timings T1 and T2 and an interval between timings T3 and T4 in FIG. 13. When input of a document image ends at timing T5, but the total code amount accidentally exceeds the target value immediately before timing T5, no next document image can be input until re-encoding by the re-encoding unit 112 is completed.

The third modification solves the above problem. The arrangement of the encoding unit 6 according to the third modification is shown in FIG. 14.

Figure 14:
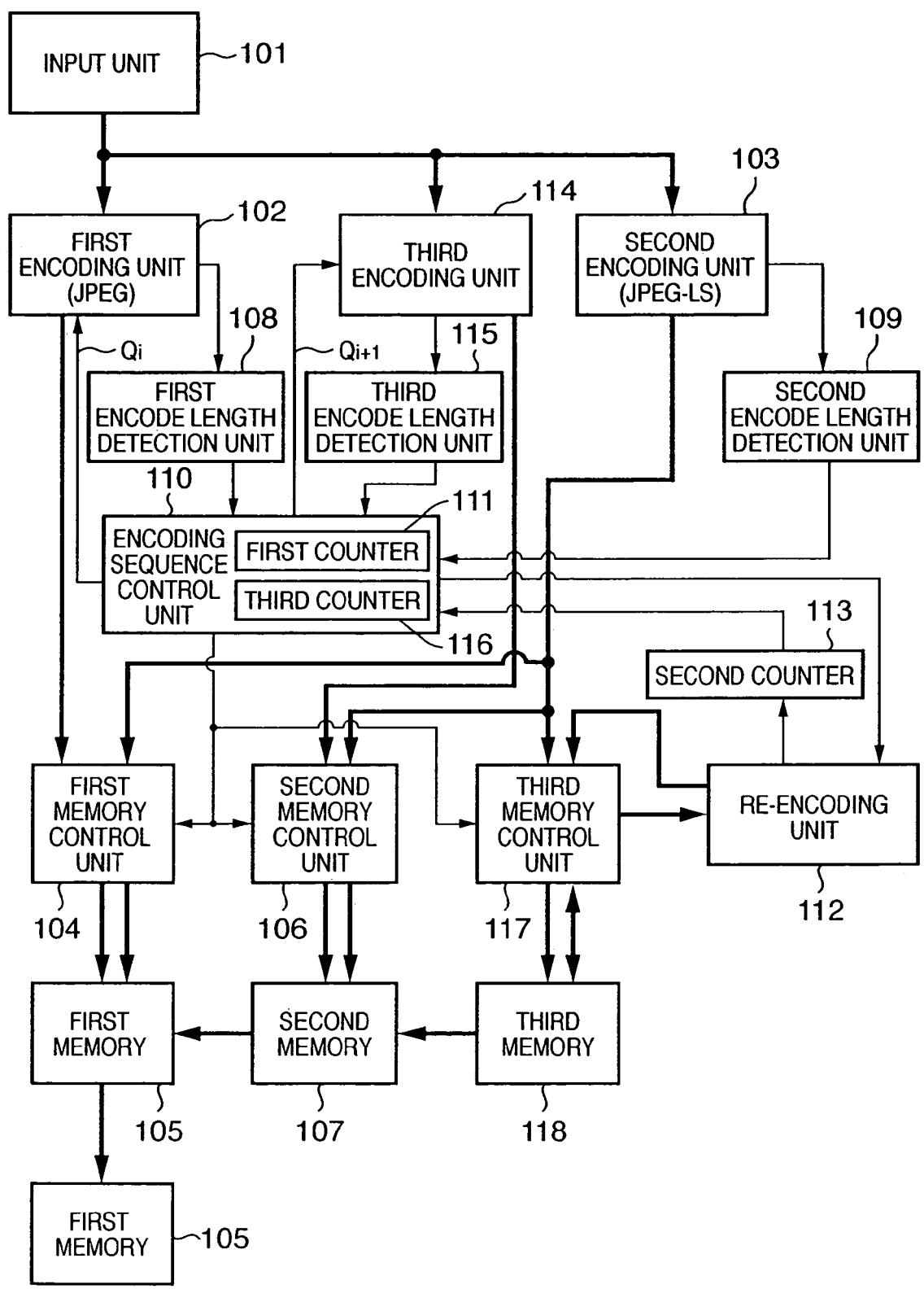
FIG. 14 is a block diagram showing another modification of the encoding unit according to the first embodiment.

The arrangement in FIG. 14 is different from that in FIG. 1 in that the encoding unit 6 adopts a third encoding unit 114 serving as a JPEG (lossy) encoding unit, a third encode length detection unit 115 which detects the encode length of a pixel block that is generated by the third encoding unit 114, a third counter 116, a third memory control unit 117, and a third memory 118. Similar to the first embodiment, the third encoding unit 114 adds a bit representing JPEG encoding (lossy encoding) at the start of generated encoded data.

In FIG. 1, only one JPEG encoding unit performs lossy (JPEG) encoding. To the contrary, in FIG. 14 according to the third modification, two, first and third image encoding units 102 and 202 are arranged, and these two lossy encoding units parallel-execute an encoding process. The first and third encoding units 102 and 114 are different in a set parameter. More specifically, when a quantization matrix table Qi is set for the first encoding unit 102, a quantization matrix table Qi+1 larger by one step is always set for the third encoding unit 114. At the initial stage at the start of encoding one page, a quantization matrix table set for the first encoding unit 102 is Q0, and that set for the third encoding unit 114 is Q1.

The first, second, and third encoding units 102, 103, and 114 execute an encoding process for the same pixel block at almost the same timing, and generate and output encoded data at almost the same timing.

Furthermore, losslessly encoded data output from the second encoding unit 103 is unconditionally stored in the third memory 118 via the third memory control unit 117. Upon the completion of encoding one page, encoded data stored in the first memory 105 is finally obtained encoded data, similar to the first embodiment.

An outline of a process by the encoding sequence control unit 110 in the arrangement of FIG. 14 will be explained.

A basic process for each pixel block in the encoding sequence control unit 110 according to the third modification is as follows.

1. Letting Qi be a quantization matrix table set for the first encoding unit 102 (Q0 at the initial stage), the encoding sequence control unit 110 always sets for the third encoding unit 114 a quantization matrix table Qi+1(Q1 at the initial stage) larger by one step.

2. The encoding sequence control unit 110 outputs a control signal to the first memory control unit so as to store in the first memory 105 a smaller one of lossily encoded data output from the first encoding unit 102 and losslessly encoded data output from the second encoding unit 103. The encoding sequence control unit 110 adds a shorter one of the encode lengths of the two encoded data to the first counter 111. That is, the first counter 111 stores information representing an encoded data amount in the first memory 105, similar to the first embodiment.

3. The encoding sequence control unit 110 outputs a control signal so as to store in the second memory 107 a smaller one of lossily encoded data output from the third encoding unit 114 and losslessly encoded data output from the second encoding unit 103. The encoding sequence control unit 110 accumulates and adds a shorter one of the encode lengths of the two encoded data to the third counter 116.

An outline of a process by the encoding sequence control unit 110 during an encoding process for one page will be explained.

The encoding sequence control unit 110 determines whether the value (encoded data amount in the first memory 105) of the first counter 111 has exceeded a target data amount. If the encoding sequence control unit 110 determines that the value does not exceed the target data amount and an encoding process for one page is completed, the encoding sequence control unit 110 outputs, to the secondary storage device 7 via the correction unit 120, encoded data stored in the first memory 105 as the encoding result of the encoding unit 6.

If the encoding sequence control unit 110 determines that the value of the first counter 111 has exceeded the target data amount, the encoding sequence control unit 110 executes the following steps.

Step 1: The encoding sequence control unit 110 requests the first memory control unit 104 to discard encoded data of image data in the first memory 105.

Step 2: The encoding sequence control unit 110 transfers encoded data (data containing both lossily and losslessly encoded data on the basis of the quantization matrix table Qi+1) stored in the second memory 107 to the first memory 105. Along with this, the value of the first counter 111 is updated to the value of the third counter 116 (the value of the third counter 116 is overwritten in the first counter 111).

Step 3: Upon the completion of transfer from the second memory 107 to the first memory 105, the encoding sequence control unit 110 outputs a control signal to the second memory 107 so as to discard data in the second memory 107.

Step 4: The encoding sequence control unit 110 updates the quantization matrix table for the first encoding unit 102 to Qi+1, that for the third encoding unit 114 to Qi+2, and continues encoding.

Step 5: The encoding sequence control unit 110 sets the quantization matrix table Qi+2 (identical to the updated quantization matrix table for the third encoding unit 114) for the re-encoding unit 112, and causes the re-encoding unit 112 to re-encode the losslessly encoded data stored in the third memory 118. The re-encoding unit 112 has the same arrangement as that in the first embodiment, and a description thereof will be omitted. Re-encoded data obtained by the re-encoding process is stored again in the third memory. At this time, the encoded data amount generated by the re-encoding process is represented by the second counter 113.

Step 6: Upon the completion of re-encoding in step 5, the encoding sequence control unit 110 transfers the re-encoded data obtained by the re-encoding process to the second memory, and adds the value of the second counter 113 to the third counter 116.

Of steps 1 to 6, steps 1 to 5 can be performed at a speed high enough to input image data from the input unit 101. For this reason, a period during which the encoded data amount is unknown, like an interval between timings Ti and T2 or an interval between timings T3 and T4 in FIG. 13, can be shortened. In particular, the update process for the first counter 111 in step 2 may be performed before the completion of the transfer process. In this case, the period during which the encoded data amount is unknown can be substantially ignored.

If the encoded data amount given by the first counter 111 exceeds the target value immediately before timing T5 in FIG. 13, the process starts from step 1, and upon the completion of step 2, encoded data is written in the secondary storage device 7 because the target encoded data has been stored in the first memory 105. Then, loading and encoding processes for the next page can start without performing the process from step 3.

An outline of operation in the arrangement of FIG. 14 has been described. When two lossy encoding units and one lossless encoding unit are juxtaposed, like the third modification, 1-page image data is encoded on the basis of the flowchart shown in FIG. 15.

Figure 15:
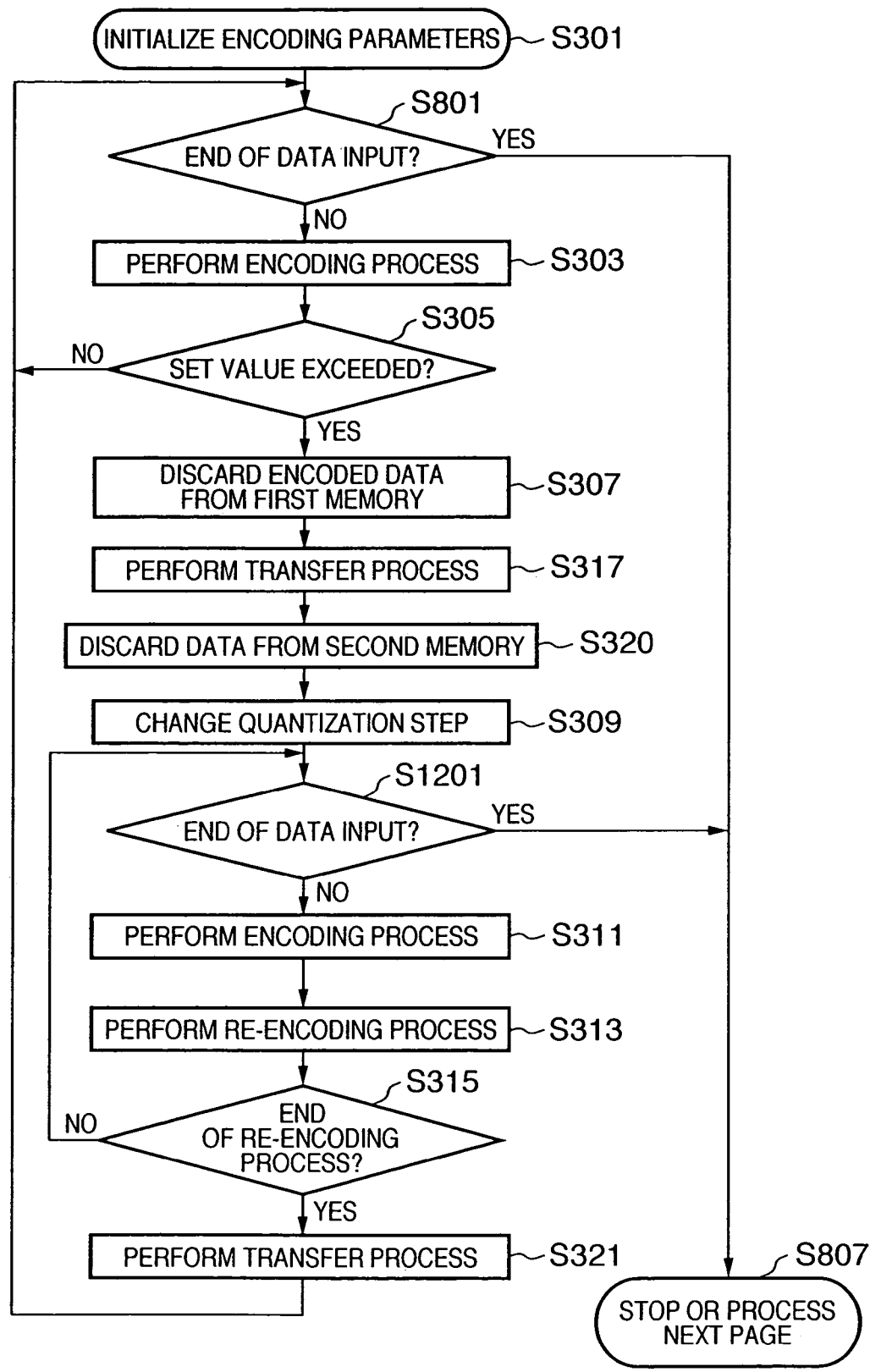
FIG. 15 is a flowchart showing a process sequence in the arrangement of FIG. 14.

Note that most of the process in FIG. 15 is similar to that in FIG. 9, the process will be described in three phases, and points different from those in FIG. 9 will be mainly described below.

The largest difference between the flow of FIG. 9 and that of the third modification is that the transfer process from the second memory 107 to the first memory 105 in step S317 is moved between step S307 and step S309. In addition to this, a process (step S320) of discarding data in the second memory 107 is added after the end of the transfer process, and a transfer process (step S321) from the third memory to the second memory is added upon the completion of a re-encoding process.

In initial setting of encoding parameters in step S301, an initial quantization matrix table Q0 to be set for the first image encoding unit 102 is determined, and a quantization matrix table Q1 larger by one step is set for the third image encoding unit 114.

Figure 16:
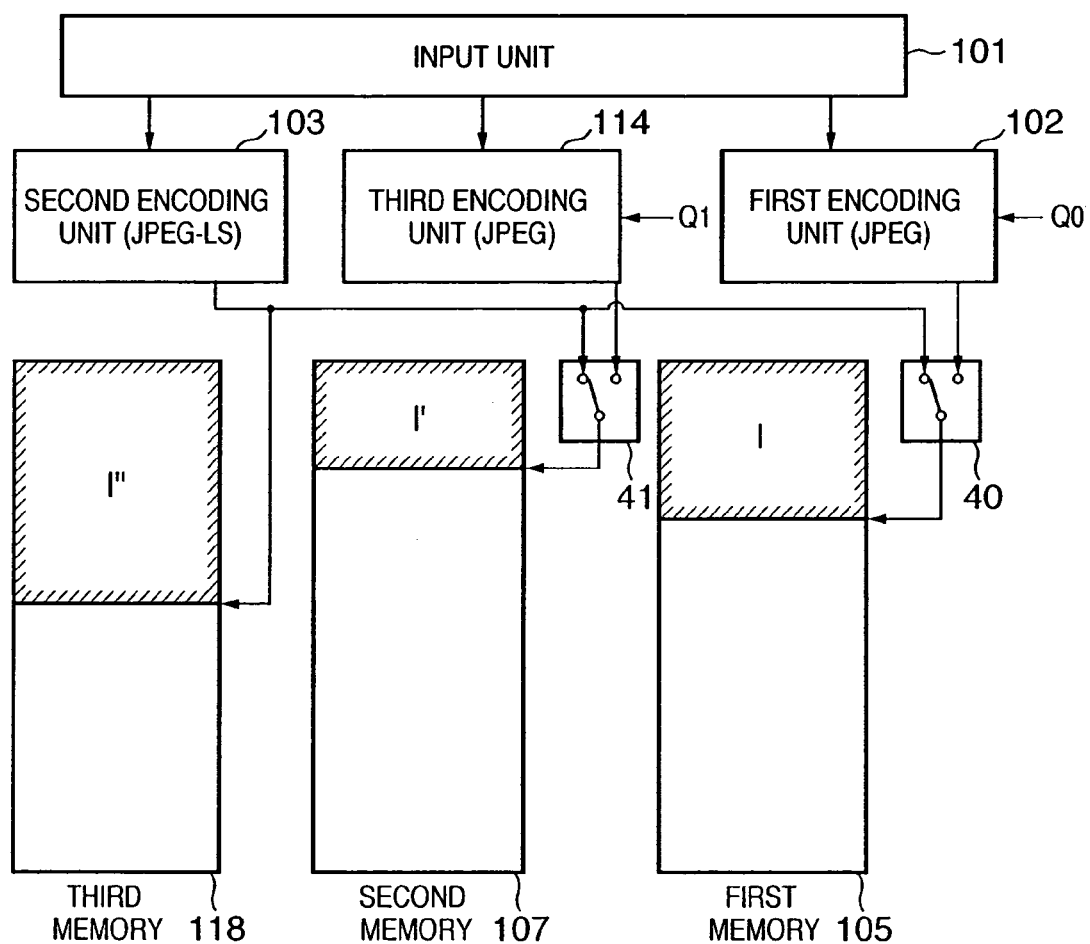
FIG. 16 is a view showing a data flow and memory contents in the encoding phase in an initial state in the arrangement of FIG. 14.

In the encoding phase, steps S801, S303, and S305 are repetitively executed. FIG. 16 shows the storage state of encoded data in the first to third memories in the encoding phase. In FIG. 16, the switch 40 is identical to that in the first embodiment. A switch 41 is implemented by the second memory control unit 106 and encoding sequence control unit 110. That is, the switch 40 selects, for each pixel block, encoded data of a shorter encode length among encoded data output from the first and second encoding units 102 and 103, and the selected encoded data is stored in the first memory 105. The switch 41 selects, for each pixel block, encoded data of a shorter encode length among encoded data output from the third and second encoding units 114 and 103, and the selected encoded data is stored in the second memory 107. The third memory 118 unconditionally stores encoded data from the second encoding unit 103.

A case wherein the encoded data amount (area I shown in FIG. 16) in the first memory 105 exceeds a target value will be examined. This is a case wherein it is determined in step S305 that the encoded data amount has exceeded the target data amount.

At this time, encoded data held in the first memory 105 is discarded (step S307). Encoded data (area I') having a high compression ratio that is held in the second memory 107 is transferred to the first memory 105, and the value of the third counter 116 is written in the first counter 111 (step S317). After transfer, the encoded data stored in the second memory 107 is discarded, and the value of the third counter is cleared to 0 (step S320). A new quantization matrix table Q1 is set for the first encoding unit 102, and a new quantization matrix table Q2 is set for the second encoding unit 103 (step S309).

Figure 17:
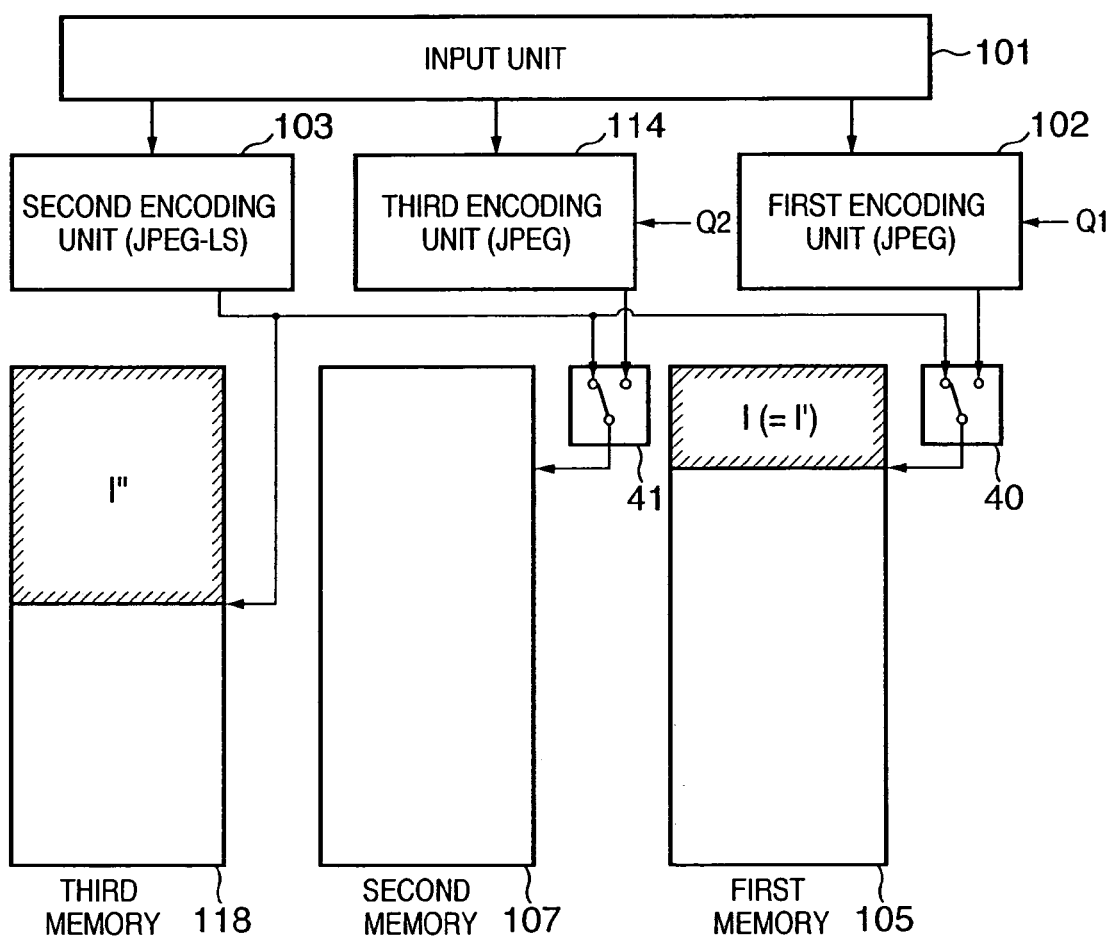
FIG. 17 is a view showing a data flow and memory contents when the encoded data amount exceeds a target data amount in the arrangement of FIG. 14.

FIG. 17 shows the storage state of each memory immediately after step S309. In step S311, the processes of the first, third, and second encoding units 102, 114, and 103 continue. In other words, the first encoding unit 102 continues encoding on the basis of the newly set quantization matrix table Q1. Encoded data of image data input after it is determined that the encoded data amount has exceeded the target data amount is stored in the second memory 107, but no preceding encoded data exists.

The re-encoding unit 112 starts re-encoding encoded data (losslessly encoded data) in the area I" in FIG. 16 that is stored in the third memory 118. The arrangement of the re-encoding unit 112 is the same as that described in the first embodiment except that the set quantization matrix table is Q2 which is also set for the third encoding unit 114. Re-encoded data obtained by the re-encoding process is stored again in the third memory 118.

Figure 18:
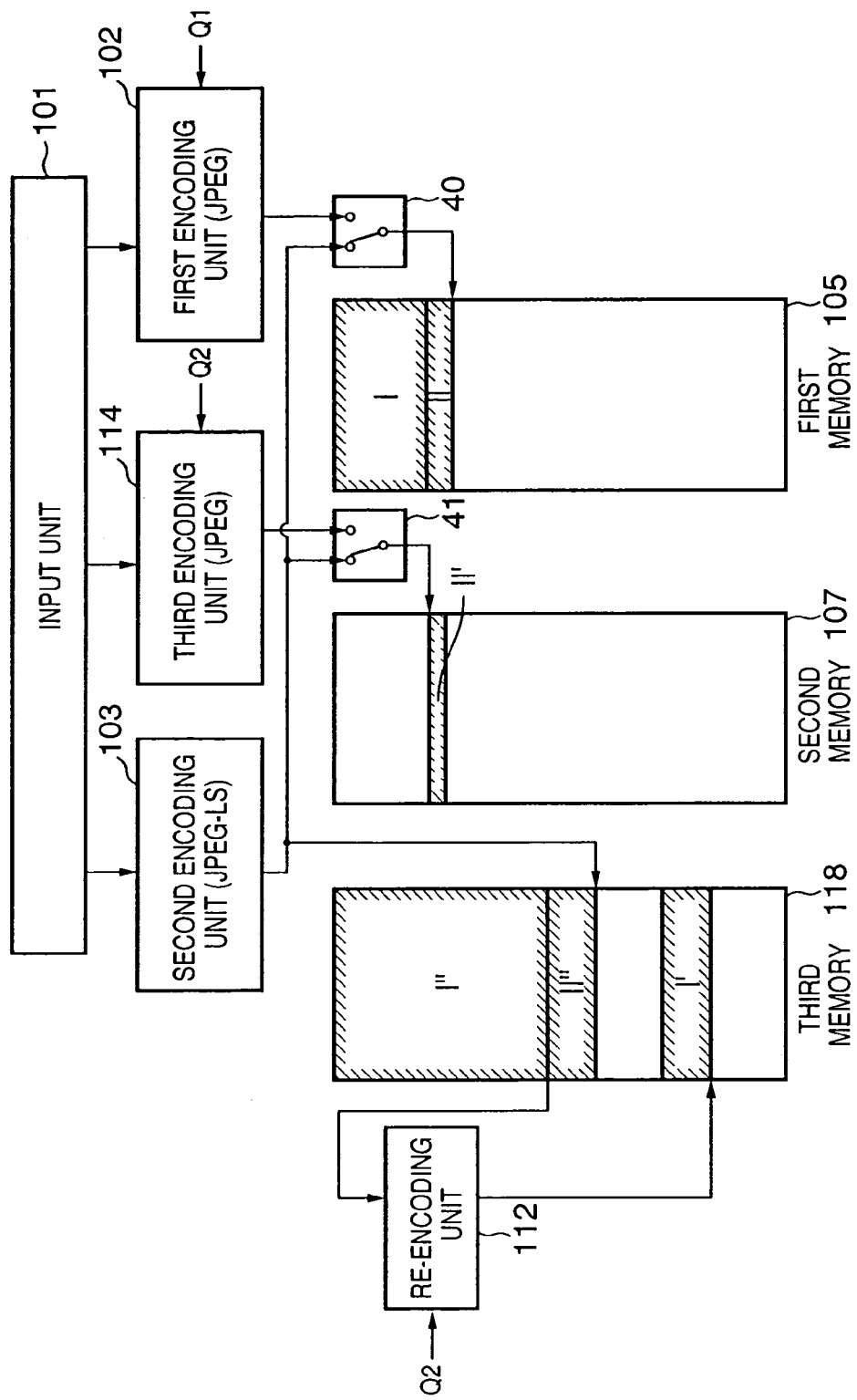
FIG. 18 is a view showing a data flow and memory contents upon the completion of the encoding/re-encoding phase in the arrangement of FIG. 14.

FIG. 18 shows the storage state of each memory immediately after it is determined that the re-encoding process has been completed. As shown in FIG. 18, the third memory 118 stores re-encoded data (area I' in FIG. 18) corresponding to the area I" in FIG. 18. The re-encoding process requires a slightly long time, and encoded data are newly stored as represented by the areas II, II', and II" in FIG. 18.

Figure 19:
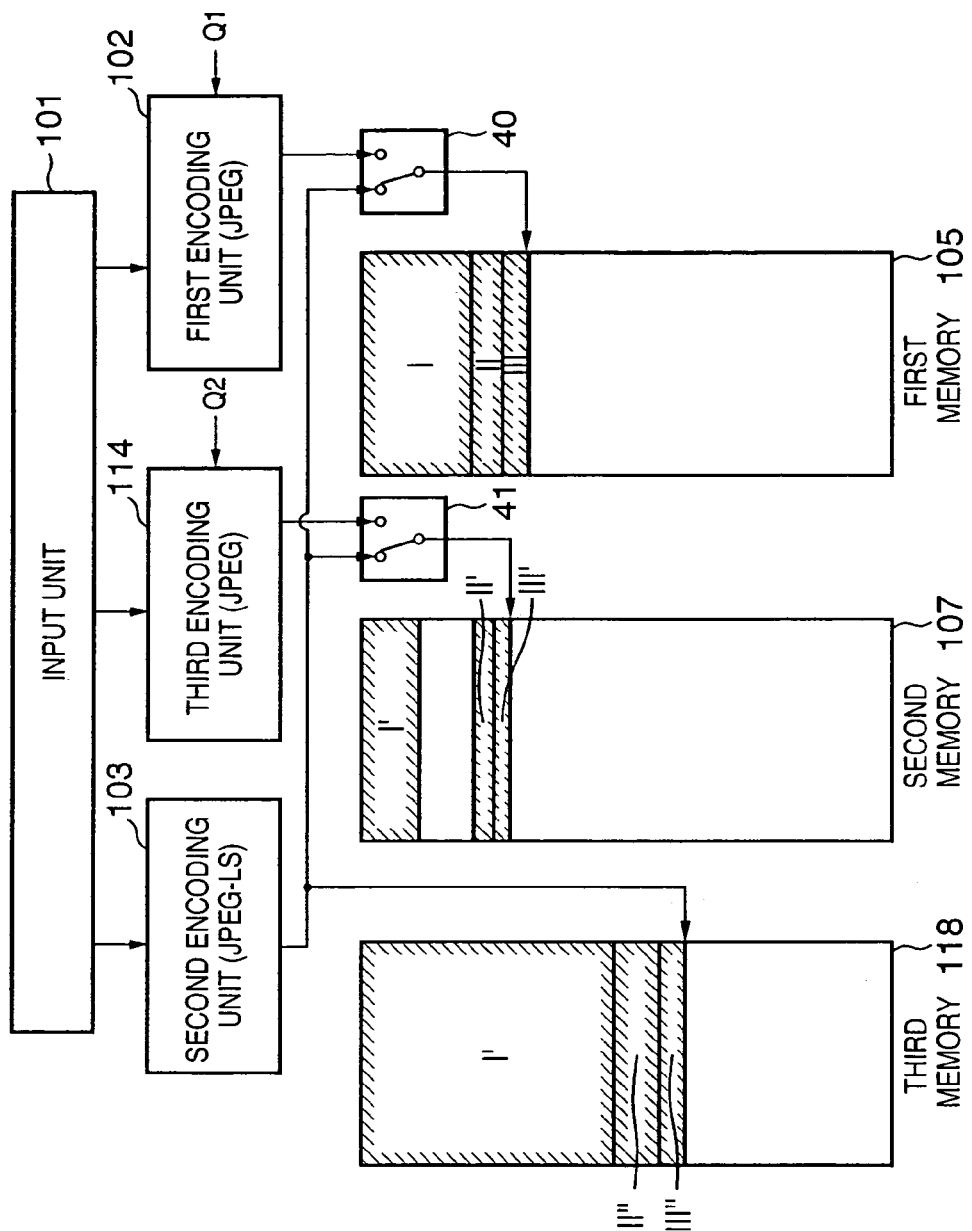
FIG. 19 is a view showing a data flow and memory contents in the encoding phase after the encoding/re-encoding phase in the arrangement of FIG. 14.

Upon the completion of re-encoding, encoded data in the area I' that is stored in the third memory 118 is transferred to the second memory 107, and the value of the second counter 113 representing the code data amount of re-encoding is added to the third counter 116 (step S321). After that, the process returns to the encoding sequence from step S801. FIG. 19 shows a state in which the process returns to the encoding sequence and encoding progresses to a certain degree (areas III, III', and III" shown in FIG. 19 are added). In FIG. 19, a free area exists between the areas I' and II' in the second memory 107, but may be eliminated by transfer within the memory 107. However, no problem occurs because the second memory 107 is auxiliary, and if the encoded data amount exceeds the target data amount again, encoded data in the areas I', II', and III' in FIG. 19 are transferred to the first memory 105 in the order named.

The third modification has been described. According to the third modification, when the encoded data amount in the first memory 105 exceeds a target data amount, encoded data which has a compression ratio higher by one step and is stored in the second memory 107 is kept used as data before the encoded data amount exceeds the target data amount. The period during which the value of the first counter 111 becomes unknown can be substantially ignored or shortened. The re-encoding process suffices to be performed before the encoded data amount exceeds the target data amount again, and thus the process of the re-encoding unit 112 need not be as fast as in the first embodiment. Even if the value of the first counter 111 exceeds the target data amount immediately before timing T5 in FIG. 9 and the process reaches timing T5, a subsequent process, i.e., re-encoding process can be omitted as far as transfer from the second memory 107 to the first memory 105 is completed. The process can quickly proceed to encoding of the next page (this corresponds to "YES" in step S1201 of FIG. 15).

The re-encoding result of the re-encoding unit 112 is stored in the third memory 118 in the third modification, but may be stored in the second memory 107, similar to the first modification.

The three modifications of the encoding unit have been described. Each modification can obviously attain the same operation effects as those of the first embodiment when the correction unit 120 performs the same process as that in the first embodiment.

Second Embodiment

The correction unit 120 in the above-described first embodiment unconditionally converts isolated losslessly encoded data into lossily encoded data.

It should be noted that JPEG-LS is employed as lossless encoding in the embodiment. For this reason, when the code amount of isolated losslessly encoded data is equal to or smaller than a predetermined threshold, the pixel block is a character/line image or the like at high possibility. This situation will be easily understood from a case wherein characters (the name of a photographer and the date and time) and the like are synthesized in a natural picture.

In this situation, if isolated losslessly encoded data is converted into lossily encoded data by JPEG encoding, the sharpness of a character/line image may be lost, degrading the image quality. To prevent this, according to the second embodiment, isolated losslessly encoded data is conditionally converted into lossily encoded data.

An encoding unit 6 can take any one of the block arrangements in FIGS. 1, 2, and 14. Hence, only a process by a correction unit 120 will be explained below.

Figure 25:
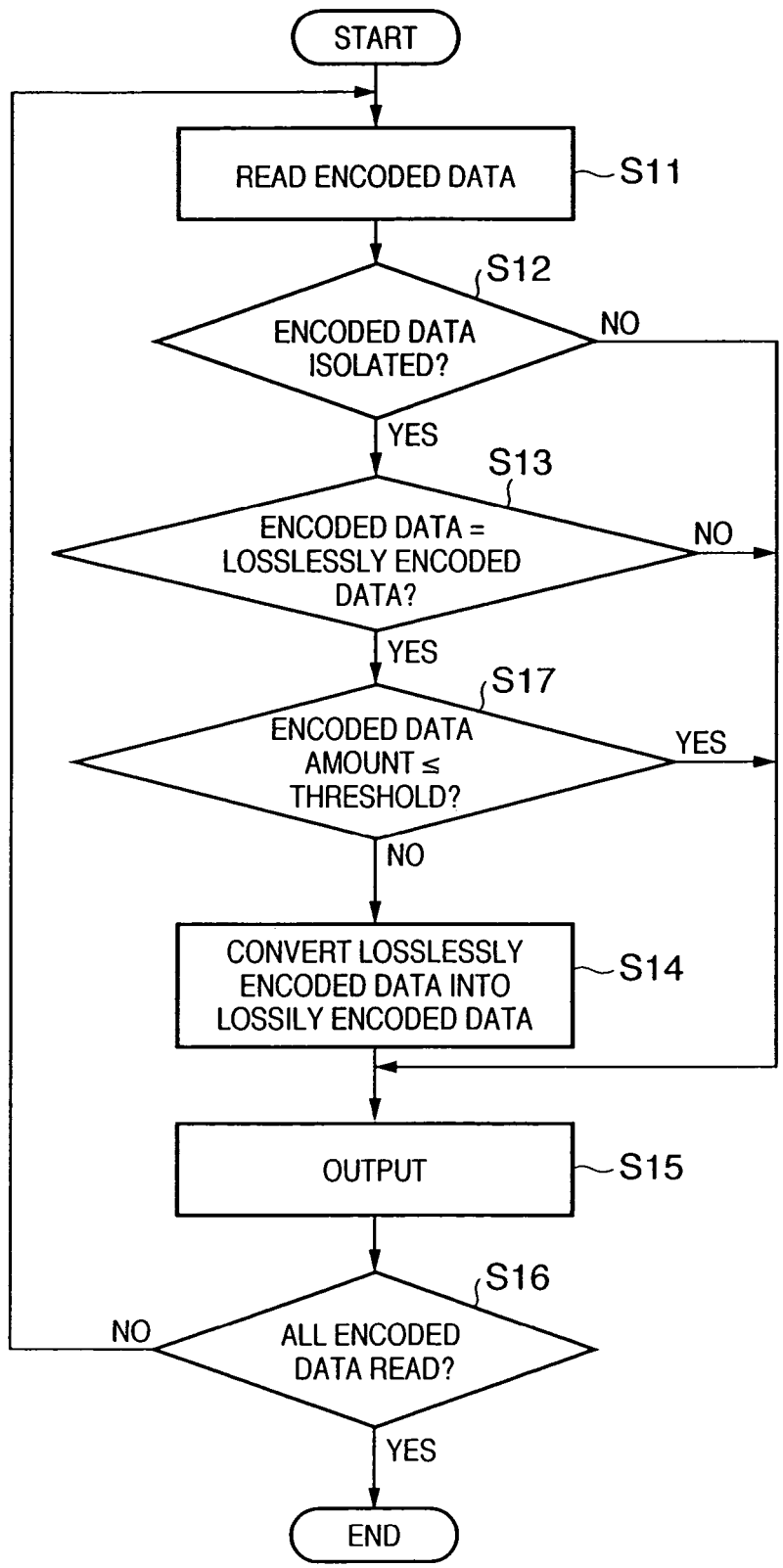
FIG. 25 is a flowchart showing the process sequence of a correction process according to the second embodiment.

FIG. 25 is a flowchart showing the process sequence of the correction unit 120 according to the second embodiment.

The process in FIG. 25 is the same as that in FIG. 24 except that step S17 is added. By adding step S17 shown in FIG. 25, isolated losslessly encoded data is not converted when its encoded data amount is equal to or smaller than a preset threshold, and is converted into lossily encoded data only when the encoded data amount exceeds the threshold.

Accordingly, in addition to the operation effects of the first embodiment, the second embodiment can attain the operation effect of, when a character/line image or the like exists in a natural picture, maintaining the sharpness and visibility of the character/line image.

Third Embodiment

In the second embodiment, isolated losslessly encoded data is conditionally converted into lossily encoded data. In the third embodiment, isolated lossily encoded data is also taken into consideration.

Figure 26:
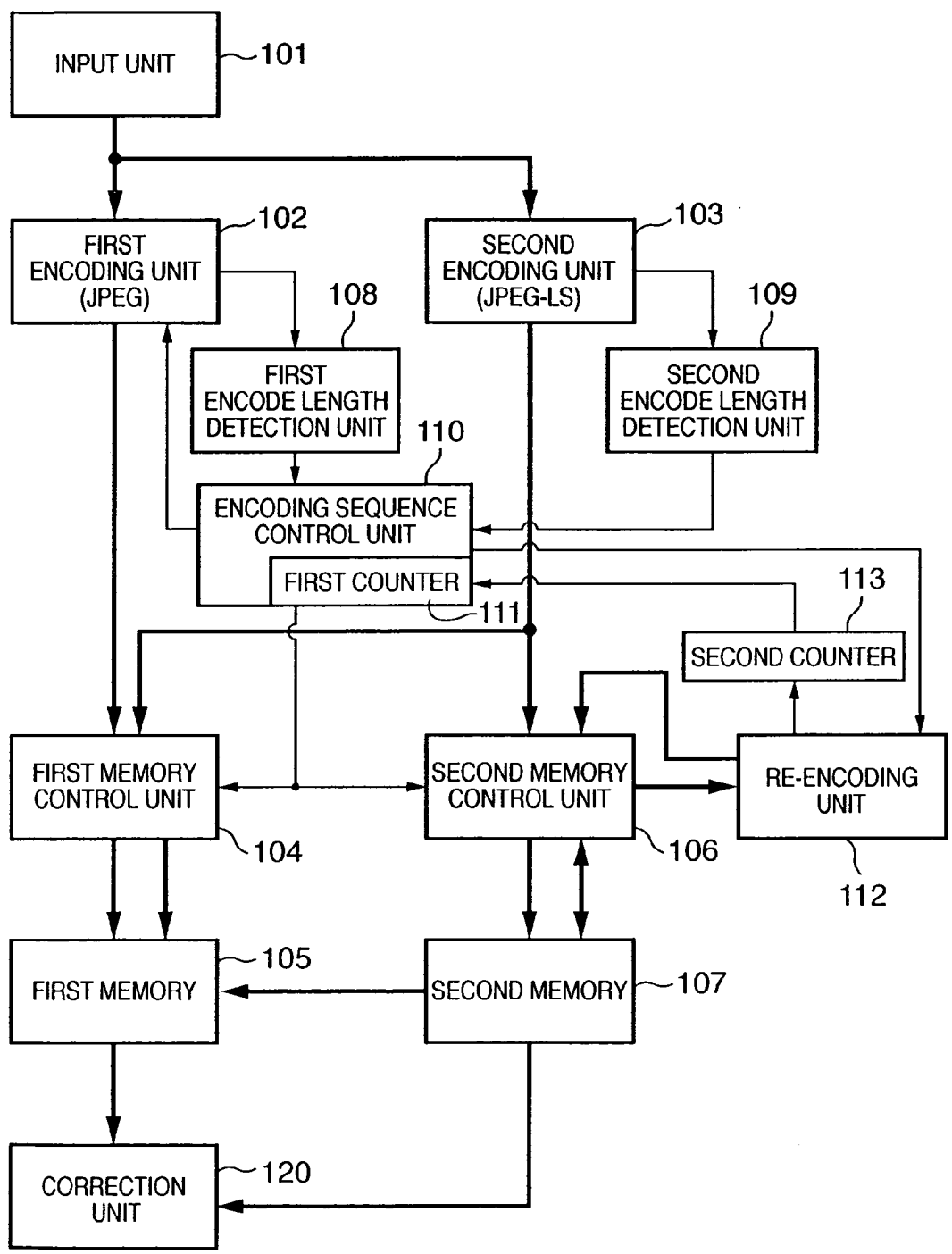
FIG. 26 is a block diagram showing an encoding unit according to the third embodiment.

FIG. 26 shows the arrangement of an encoding unit 6 according to the third embodiment. The encoding unit 6 in FIG. 26 is different from that in FIG. 1 in that a correction unit 120 also refers to a second memory 107. The third embodiment is based on FIG. 1, but may also be based on FIG. 2 or 14. In short, the correction unit 120 suffices to be able to access a memory (the second memory 107 in FIG. 2 or the third memory 118 in FIG. 14) which stores losslessly encoded data.

As described in the second embodiment, a character/line image often exists in a natural picture. To the contrary, a natural picture at the size of a pixel block (8×8 pixel size in the embodiment) serving as an encoding unit hardly exists isolatedly in a character/line image.

Such isolated lossily encoded data can, therefore, be unconditionally converted into losslessly encoded data.

Figure 27:
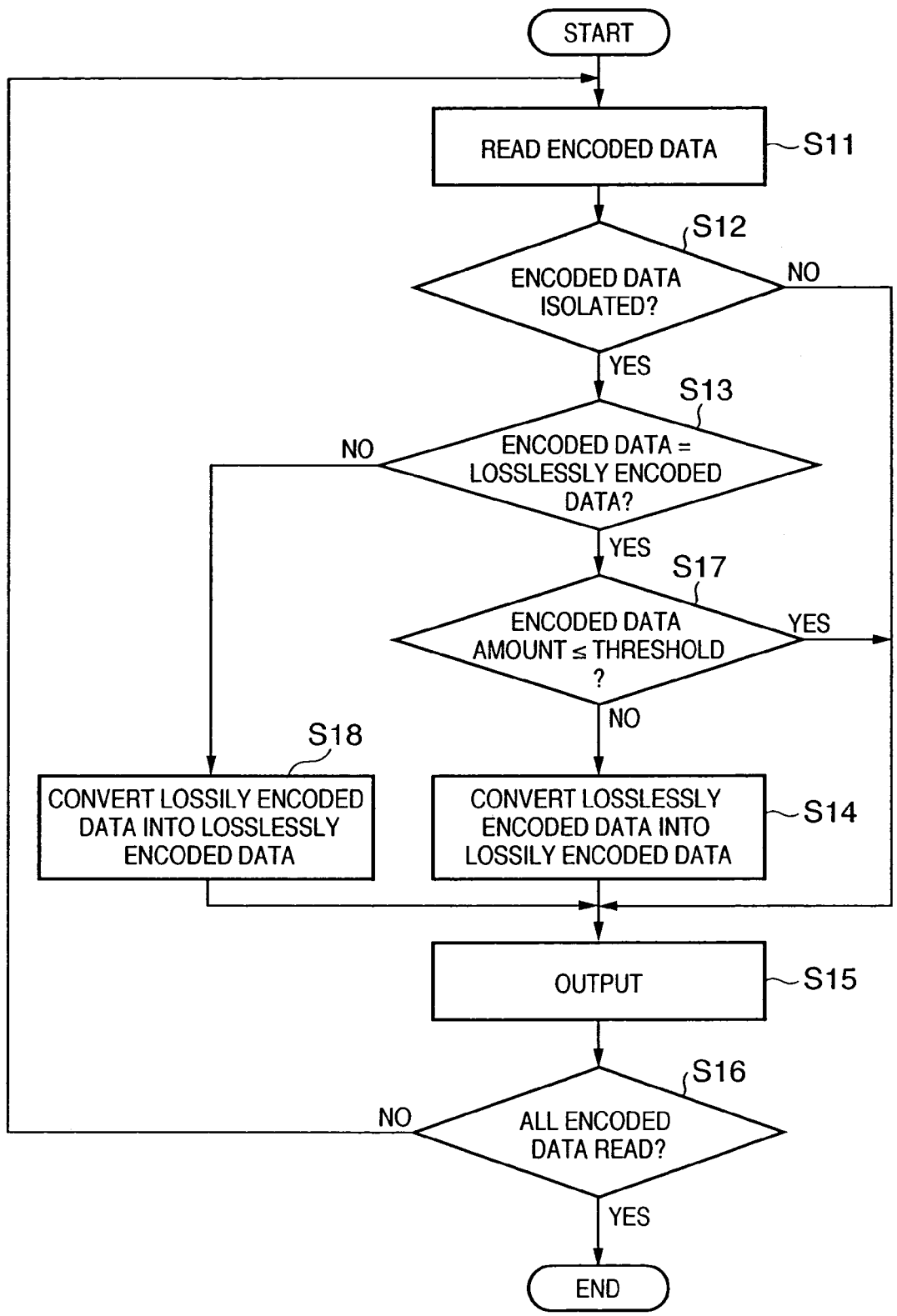
FIG. 27 is a flowchart showing the process sequence of a correction process according to the third embodiment.

FIG. 27 is a flowchart showing the process contents of the correction unit 120 according to the third embodiment. The process in FIG. 27 is different from that in FIG. 25 (second embodiment) in that step S18 is added.

If it is determined in step S13 that encoded data is not losslessly encoded data, i.e., is isolated lossily encoded data, the process advances to step S18. In step S18, losslessly encoded data at the same position as a pixel block of interest is read out from the second memory 107. The readout encoded data is output as a conversion result in step S15.

In addition to the operation effects of the second embodiment, according to the third embodiment, lossily encoded data which is isolated for any reason is replaced with losslessly encoded data, and the losslessly encoded data is output. Hence, an image in which block noise is suppressed can be formed.

The first to third embodiments according to the present invention have been described, and the first, second, and third memories 105, 107, and 118 are described as physically different memories. It is one of features of the present invention to independently arrange these memories. However, the present invention incorporates even a case wherein these memories are not physically different memories. Assume that two (or three) areas corresponding to the first and second (and third) memories are ensured in physically one memory when the transfer speed of a memory is high enough. In this case, it is obvious from the above description with the first and second memories being replaced with the first and second memory areas that the present invention can be realized by one memory.

If each embodiment described above is implemented by one memory, some steps in the data transfer process described with reference to the transfer phase become unnecessary. Details of each of such cases can be easily expected, and hence a description thereof will be omitted. When the two areas are strictly separated from each other and used, the data transfer process is required as in the case wherein physically two memories are used. If, however, identical data are shared between the two areas, the data transfer process can be omitted, and the storage capacity can also be reduced.

For example, in transferring encoded data held in the second memory area to the first memory area, two kinds of information on the start address at which the encoded data is stored and the data size of the encoded data are transferred from the second memory control unit to the first memory control unit, thereby obtaining the same effects as transferring the encoded data.

If the encoded data is stored in a file or packet form, the amount of information to be transferred between the memory control units slightly increases, and management table information associated with the encoded data must be transferred.

In the above embodiments, encoding is targeted to an 8×8 pixel block size, but this size does not limit the present invention. In short, two encoded data amounts generated for the same image area suffice to be compared using two (or more) different encoding techniques. For example, JPEG encoding can be done for each N×M pixel block, and JPEG-LS can be done for each 2N×2M pixel block. In this case, four JPEG-encoded data and one JPEG-LS encoded data may be compared.

Figure 28:
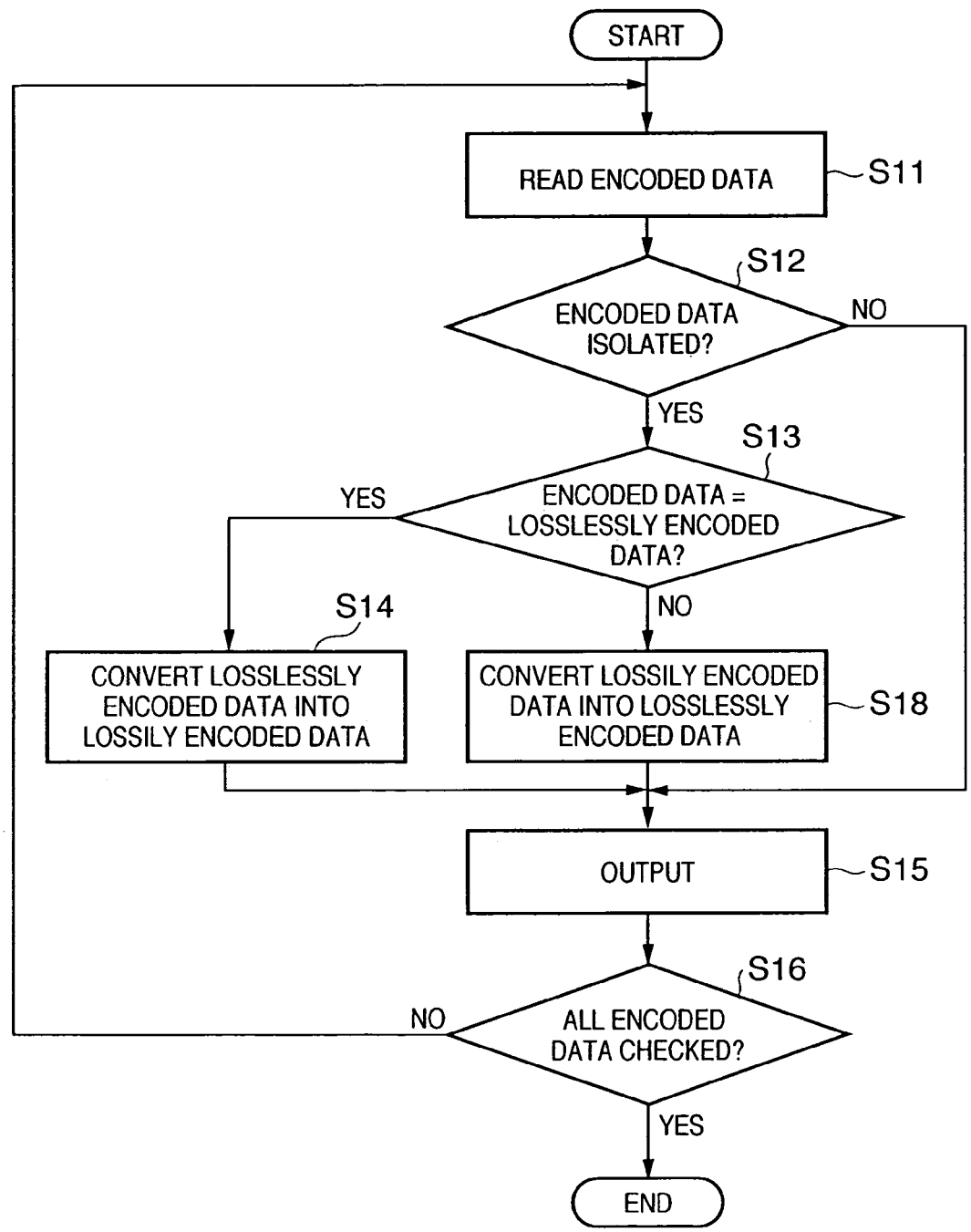
FIG. 28 is a flowchart showing the process sequence of another correction process according to the third embodiment.

In the third embodiment, isolated losslessly encoded data is conditionally converted into lossily encoded data, which is a desirable form. However, the condition is not essential to the present invention because it has been confirmed that an image with a sufficient image quality is formed even if no condition is made. That is, the process at step S17 in FIG. 27 may be omitted, like as FIG. 28.

In the embodiments, isolated encoded data has been described on the assumption that the type (lossless or lossy type) of encoded data of one pixel block of interest is different from the type of eight neighboring encoded data. However, this assumption may be expanded to a case wherein encoded data of the same type are consecutive by a count of 1 to N. In this case, N is also determined depending on the read resolution, but remains representing a small area, and is desirably a single-digit number at most.

In the above embodiments, lossy encoding "JPEG" and lossless encoding "JPEG-LS" are adopted as two encoding techniques. These two encoding techniques are different in whether the technique is lossless or lossy. At the same time, JPEG is suitable for natural pictures, JPEG-LS is suitable for character/line images and computer graphics, and these techniques are different in encoding efficiency. The use of two encoding techniques which have different properties in terms of whether the technique is lossless encoding or lossy encoding and is suited to character/line images or natural pictures acts advantageously to the present invention.

In the above embodiments, the present invention is applied to the copying machine shown in FIG. 22. It is apparent that the present invention can also be applied to a case wherein an image input apparatus such as an image scanner is connected to a general-purpose information processing apparatus such as a personal computer to encode data. In this case, a program associated with the process shown in FIG. 23 (including the process shown in FIG. 3 (or FIG. 9) or FIG. 15) suffices to be executed, and the computer program apparently falls within the scope of the present invention. In general, the computer program can be executed by setting a computer-readable storage medium such as a CD-ROM in a computer, and copying or installing the computer program into the system. As a matter of course, the computer-readable storage medium also falls within the scope of the present invention.

As has been described above, according to the present invention, while lossless and lossy encoding techniques are employed, encoded data of a target data amount can be generated by one image data input operation. In an application of lossy encoding to part or all of an image, a common encoding parameter can be used for the image. Further, generation of block noise can be suppressed.

Since JPEG as lossy encoding and JPEG-LS as lossless encoding are used, encoding suitable for a character/line image or natural picture can be selected without arranging any special area determination circuit. Encoded data high in both image quality and compression ratio upon decoding can be generated.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-261570 filed on Sep. 8, 2004, which is hereby incorporated by reference herein.

What is claimed is:

1. An image encoding apparatus which receives image data and encodes the image data, comprising:
    first encoding means for lossily encoding input image data for each predetermined pixel block in accordance with a first parameter to generate lossily encoded data;
    second encoding means for losslessly encoding input image data for the predetermined pixel block to generate losslessly encoded data;
    first storage means for storing, of the encoded data generated by said first encoding means and said second encoding means, encoded data of a shorter encode length in a predetermined first memory;
    second storage means for storing the losslessly encoded data generated by said second encoding means in a predetermined second memory;
    re-encoding means for decoding the losslessly encoded data in the second memory, re-encoding the decoded data in accordance with a second parameter to generate lossily encoded data, and storing, of the lossily encoded data obtained after re-encoding and the losslessly encoded data before re-encoding, encoded data of a shorter encode length in the first memory;
    monitoring means for monitoring an encoded data amount in the first memory and determining whether the encoded data amount has exceeded a predetermined data amount;
    parameter update means for, when said monitoring means determines that the encoded data amount has exceeded the predetermined data amount, (a) discarding the encoded data in the first memory, (b) updating the first parameter set for said first encoding means to a parameter having a high compression ratio, and causing said first encoding means to continue encoding of the image data, and (c) setting, as the second parameter, the same parameter as the updated first parameter for said re-encoding means, and causing said re-encoding means to ret-encode losslessly encoded data obtained before the encoded data amount exceeds the predetermined data amount; and
    correction means for, when an encoding process for one page is completed, correcting, of encoded data of pixel blocks that are stored in the first memory, isolated encoded data of a type different from a type of neighboring encoded data to the type of the neighboring encoded data.

2. The apparatus according to claim 1, wherein JPEG is used for encoding by said first encoding means, and JPEG-LS is used for encoding by said second encoding means.

3. The apparatus according to claim 1, wherein, if the isolated encoded data is losslessly encoded data, said correction means corrects the losslessly encoded data to lossily encoded data.

4. The apparatus according to claim 3, wherein, if the isolated encoded data is losslessly encoded data and an encoded data amount of the isolated encoded data is not less than a predetermined threshold, said correction means corrects the losslessly encoded data to lossily encoded data.

5. The apparatus according to claim 3, wherein, if the isolated encoded data is lossily encoded data, said correction means outputs, as a correction result, losslessly encoded data of a pixel block at a corresponding position in the second memory.

6. An image encoding method of receiving image data, and compression-encoding and outputting the image data, comprising:
   a first encoding step of lossily encoding input image data for each predetermined pixel block in accordance with a first parameter to generate lossily encoded data;
   a second encoding step of losslessly encoding input image data for the predetermined pixel block to generate losslessly encoded data;
   a first storage step of storing, of the encoded data generated in the first encoding step and the second encoding step, encoded data of a shorter encode length in a predetermined first memory;
   a second storage step of storing the losslessly encoded data generated in the second encoding step in a predetermined second memory;
   a re-encoding step of decoding the losslessly encoded data in the second memory, re-encoding the decoded data in accordance with a second parameter to generate lossily encoded data, and storing, of the lossily encoded data obtained after re-encoding and the losslessly encoded data before re-encoding, encoded data of a shorter encode length in the first memory;
   a monitoring step of monitoring an encoded data amount in the first memory and determining whether the encoded data amount has exceeded a predetermined data amount;
   a parameter update step of, when the encoded data amount is determined in the monitoring step to have exceeded the predetermined data amount, (a) discarding the encoded data in the first memory, (b) updating the first parameter set for the first encoding step to a parameter having a high compression ratio to continue encoding of the image data, and (c) setting, as the second parameter, the same parameter as the updated first parameter for the re-encoding step to re-encode losslessly encoded data obtained before the encoded data amount exceeds the predetermined data amount; and
   a correction step of, when an encoding process for one page is completed, correcting, of encoded data of pixel blocks that are stored in the first memory, isolated encoded data of a type different from a type of neighboring encoded data to the type of the neighboring encoded data.

7. A computer-readable medium storing a computer program that when loaded and executed by a computer causes the computer to function as an image encoding apparatus for receiving image data, compression-encoding the received image data, and outputting encoded image data, the program causing the computer to perform a method comprising:
   a first encoding step of lossily encoding input image data for each predetermined pixel block in accordance with a first parameter to generate lossily encoded data,
   a second encoding step of losslessly encoding input image data for the predetermined pixel block to generate losslessly encoded data,
   a first storage step of storing, of the encoded data generated by said first encoding step and said second encoding step of, encoded data of a shorter encode length in a predetermined first memory,
   second storage means for storing the losslessly encoded data generated by said second encoding step of in a predetermined second memory,
   a re-encoding step of decoding the losslessly encoded data in the second memory, re-encoding the decoded data in accordance with a second parameter to generate lossily encoded data, and storing, of the lossily encoded data obtained after re-encoding and the losslessly encoded data before re-encoding, encoded data of a shorter encode length in the first memory,
   a monitoring step of monitoring an encoded data amount in the first memory and determining whether the encoded data amount has exceeded a predetermined data amount,
   a parameter update step of, when said monitoring step of determines that the encoded data amount has exceeded the predetermined data amount, (a) discarding the encoded data in the first memory, (b) updating the first parameter set for said first encoding step of to a parameter having a high compression ratio, and causing said first encoding step of to continue encoding of the image data, and (c) setting, as the second parameter, the same parameter as the updated first parameter for said re-encoding step of, and causing said re-encoding step of to re-encode losslessly encoded data obtained before the encoded data amount exceeds the predetermined data amount, and
   a correction step of, when an encoding process for one page is completed, correcting, of encoded data of pixel blocks that are stored in the first memory, isolated encoded data of a type different from a type of neighboring encoded data to the type of the neighboring encoded data.

8. An image encoding apparatus which receives image data and encodes the image data, comprising:
   first encoding means for lossily encoding input image data for each predetermined pixel block in accordance with a first parameter to generate lossily encoded data;
   second encoding means for lossily encoding input image data for the predetermined pixel block in accordance with a second parameter higher in compression ratio than the first parameter to generate lossily encoded data;
   third encoding means for losslessly encoding input image data for the predetermined pixel block to generate losslessly encoded data;
   first storage means for storing, of the encoded data generated by said first encoding means and said third encoding means, encoded data of a shorter encode length in a predetermined first memory;
   second storage means for storing, of the encoded data generated by said second encoding means and said third encoding means, encoded data of a shorter encode length in a predetermined second memory;
   third storage means for storing the losslessly encoded data generated by said third encoding means in a predetermined third memory;
   re-encoding means for decoding the losslessly encoded data in the third memory, re-encoding the decoded data in accordance with a third parameter to generate lossily encoded data, and storing, of the lossily encoded data obtained after re-encoding and the losslessly encoded data before re-encoding, encoded data of a shorter encode length in the second memory;
   monitoring means for monitoring an encoded data amount in the first memory and determining whether the encoded data amount has exceeded a predetermined data amount;
   parameter update means for, when said monitoring means determines that the encoded data amount has exceeded the predetermined data amount, (a) discarding the encoded data in the first memory, and transferring the encoded data in the second memory to the first memory, (b) updating the first parameter set for said first encoding means to the second parameter set for said second encoding means, and causing said first encoding means to continue encoding of the image data, (c) discarding the encoded data in the second memory, updating the second parameter set for said second encoding means to a parameter having a high compression ratio, and causing said second encoding means to continue encoding, and (d) setting, as the third parameter, the same parameter as the updated second parameter for said re-encoding means, and causing said re-encoding means to re-encode losslessly encoded data obtained before the encoded data amount exceeds the predetermined data amount; and correction means for, when an encoding process for one page is completed, correcting, of encoded data of pixel blocks that are stored in the first memory, isolated encoded data of a type different from a type of neighboring encoded data to the type of the neighboring encoded data.

9. The apparatus according to claim 8, wherein JPEG is used for encoding by said first encoding means and said second encoding means, and JPEG-LS is used for encoding by said third encoding means.

10. The apparatus according to claim 8, wherein, if the isolated encoded data is losslessly encoded data, said correction means corrects the losslessly encoded data to lossily encoded data.

11. The apparatus according to claim 10, wherein, if the isolated encoded data is losslessly encoded data and an encoded data amount of the isolated encoded data is not less than a predetermined threshold, said correction means corrects the losslessly encoded data to lossily encoded data.

12. The apparatus according to claim 10, wherein if the isolated encoded data is lossily encoded data, said correction means outputs, as a correction result, losslessly encoded data of a pixel block at a corresponding position in the second memory.

13. An image encoding method of receiving image data, and compression-encoding and outputting the image data, comprising:

a first encoding step of lossily encoding input image data for each predetermined pixel block in accordance with a first parameter to generate lossily encoded data;

a second encoding step of lossily encoding input image data for the predetermined pixel block in accordance with a second parameter higher in compression ratio than the first parameter to generate lossily encoded data;

a third encoding step of losslessly encoding input image data for the predetermined pixel block to generate losslessly encoded data;

a first storage step of storing, of the encoded data generated in the first encoding step and the third encoding step, encoded data of a shorter encode length in a predetermined first memory;

a second storage step of storing, of the encoded data generated in the second encoding step and the third encoding step, encoded data of a shorter encode length in a predetermined second memory;

a third storage step of storing the losslessly encoded data generated in the third encoding step in a predetermined third memory;

a re-encoding step of decoding the losslessly encoded data in the third memory, re-encoding the decoded data in accordance with a third parameter to generate lossily encoded data, and storing, of the lossily encoded data obtained after re-encoding and the losslessly encoded data before re-encoding, encoded data of a shorter encode length in the second memory;

a monitoring step of monitoring an encoded data amount in the first memory and determining whether the encoded data amount has exceeded a predetermined data amount;

a parameter update step of, when the encoded data amount is determined in the monitoring step to have exceeded the predetermined data amount, (a) discarding the encoded data in the first memory, and transferring the encoded data in the second memory to the first memory, (b) updating the first parameter set for the first encoding step to the second parameter set for the second encoding step to continue encoding of the image data, (c) discarding the encoded data in the second memory, and updating the second parameter set for the second encoding step to a parameter having a high compression ratio to continue encoding, and (d) setting, as the third parameter, the same parameter as the updated second parameter for the re-encoding step to re-encode losslessly encoded data obtained before the encoded data amount exceeds the predetermined data amount; and a correction step of, when an encoding process for one page is completed, correcting, of encoded data of pixel blocks that are stored in the first memory, isolated encoded data of a type different from a type of neighboring encoded data to the type of the neighboring encoded data.

14. A computer-readable medium storing a computer program that when loaded and executed by a computer causes the computer to function as an image encoding apparatus for receiving image data, compression-encoding the received image data and outputting encoded image data, the program causing the computer to perform a method comprising:

a first encoding step of lossily encoding input image data for each predetermined pixel block in accordance with a first parameter to generate lossily encoded data, a second encoding step of lossily encoding input image data for the predetermined pixel block in accordance with a second parameter higher in compression ratio than the first parameter to generate lossily encoded data, a third encoding step of losslessly encoding input image data for the predetermined pixel block to generate losslessly encoded data, a first storage step of storing, of the encoded data generated by said first encoding step and said third encoding step of, encoded data of a shorter encode length in a predetermined first memory, a second storage step of storing, of the encoded data generated by said second encoding step of and said third encoding step of, encoded data of a shorter encode length in a predetermined second memory, a third storage step of storing the losslessly encoded data generated by said third encoding step of in a predetermined third memory, a re-encoding step of decoding the losslessly encoded data in the third memory, re-encoding the decoded data in accordance with a third parameter to generate lossily encoded data, and storing, of the lossily encoded data obtained after re-encoding and the losslessly encoded data before re-encoding, encoded data of a shorter encode length in the second memory, a monitoring step of monitoring an encoded data amount in the first memory and determining whether the encoded data amount has exceeded a predetermined data amount, a parameter update step of, when said monitoring step of determines that the encoded data amount has exceeded the predetermined data amount, (a) discarding the encoded data in the first memory, and transferring the encoded data in the second memory to the first memory, (b) updating the first parameter set for said first encoding step of to the second parameter set for said second encoding step of, and causing said first encoding step of to continue encoding of the image data, (c) discarding the encoded data in the second memory, updating the second parameter set for said second encoding step of to a parameter having a high compression ratio, and causing said second encoding step of to continue encoding, and (d) setting, as the third parameter, the same parameter as the updated second parameter for said re-encoding step of, and causing said re-encoding step of to re-encode losslessly encoded data obtained before the encoded data amount exceeds the predetermined data amount, and a correction step of, when an encoding process for one page is completed, correcting, of encoded data of pixel blocks that are stored in the first memory, isolated encoded data of a type different from a type of neighboring encoded data to the type of the neighboring encoded data.

15. An image encoding apparatus according to claim 1, wherein the image encoding apparatus is included in an image forming apparatus configured to receive a document image and form a visible image on a predetermined printing medium, and wherein the image forming apparatus further includes:

storage means for storing encoded data generated by said image encoding apparatus;

decoding means for decoding the encoded data stored in said storage means; and image forming means for forming an image on the basis of image data obtained by said decoding means.

* * * * *